(12) United States Patent
Ando et al.

(10) Patent No.: US 8,044,326 B2
(45) Date of Patent: Oct. 25, 2011

(54) STEAM COOKING APPARATUS

(75) Inventors: Yuzi Ando, Yamatokoriyama (JP); Yuko Nakajima, Nara (JP); Mari Terada, Ikoma (JP); Rika Nozawa, Osaka (JP); Noriko Ohashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 174 days.

(21) Appl. No.: 12/501,222

(22) Filed: Jul. 10, 2009

(65) Prior Publication Data

US 2009/0272729 A1 Nov. 5, 2009

Related U.S. Application Data

(62) Division of application No. 10/593,234, filed as application No. PCT/JP2004/018249 on Dec. 8, 2004, now Pat. No. 7,759,615.

(30) Foreign Application Priority Data

Mar. 19, 2004 (JP) ................................. 2004-080526

(51) Int. Cl.
*F24C 13/00* (2006.01)
*A21B 1/24* (2006.01)

(52) U.S. Cl. .......... 219/401; 219/484; 219/486; 99/331; 99/468

(58) Field of Classification Search ........................ None
See application file for complete search history.

(56) References Cited

U.S. PATENT DOCUMENTS

| 4,756,916 | A | * | 7/1988 | Dreher et al. | 426/302 |
| 4,823,767 | A | * | 4/1989 | Wust | 126/20 |
| 4,924,072 | A | * | 5/1990 | Oslin | 219/401 |
| 4,933,199 | A | * | 6/1990 | Neel et al. | 426/438 |
| 5,171,600 | A | * | 12/1992 | Young et al. | 426/550 |
| 5,188,859 | A | * | 2/1993 | Lodge et al. | 426/560 |
| 6,008,482 | A | | 12/1999 | Takahashi et al. | |
| 6,026,736 | A | * | 2/2000 | Turner | 99/349 |
| 6,911,626 | B2 | * | 6/2005 | Shozo | 219/401 |

FOREIGN PATENT DOCUMENTS

| CN | 1436965 A | 8/2003 |
| JP | 54-38189 | 8/1952 |
| JP | 54-103175 A | 8/1979 |
| JP | 54-123749 A | 9/1979 |
| JP | 54-126169 A | 10/1979 |

(Continued)

*Primary Examiner* — Joseph M Pelham

(74) *Attorney, Agent, or Firm* — Birch, Stewart, Kolasch & Birch, LLP

(57) ABSTRACT

A steam cooking apparatus having a steam generating device that generates steam to be fed to a heating chamber and a vapor heating heater that heats the steam generated by the steam generating device to provide superheated steam. The steam cooking apparatus includes a first heating mode using the superheated steam obtained from the vapor heating heater and a second heating mode using hot air or radiation heat obtained by using the vapor heating heater without use of the steam generating device so that the second heating mode produces heat without a supply of steam.

13 Claims, 20 Drawing Sheets

FOREIGN PATENT DOCUMENTS

| | | |
|---|---|---|
| JP | 54-127769 A | 10/1979 |
| JP | 61-178101 | 11/1986 |
| JP | 63-116817 | 7/1988 |
| JP | 3-67902 U | 7/1991 |
| JP | 3-247919 | 11/1991 |
| JP | 8-49854 A | 2/1996 |
| JP | 9-4849 A | 1/1997 |
| JP | 11-141881 A | 5/1999 |
| JP | 2001-263667 A | 9/2001 |
| JP | 2002-272604 A | 9/2002 |
| JP | 2003339356 | 12/2003 |
| JP | 2004-340472 A | 12/2004 |

* cited by examiner

FIG.16

| COOKING MENUS | STEAM GENERATING HEATER | | VAPOR HEATING HEATER | | TOTAL ELECTRIC POWER CONSUMPTION (W) |
|---|---|---|---|---|---|
| | MAIN | SUB | MAIN | SUB | |
| STEAM (AMOUNT OF EVAPORATION 22g/min) | 700 | 300 | — | 300 | 1300 |
| BROWN (AMOUNT OF EVAPORATION 6g/min) | — | 300 | 1000 | — | 1300 |
| GRILL (AMOUNT OF EVAPORATION 0g/min) | — | — | 1000 | 300 | 1300 |

FIG.17

| AMOUNT OF EVAPORATION (g/min) | NECESSARY ELECTRIC POWER (W) | ELECTRIC POWER OF STEAM GENERATING HEATER (W) |
|---|---|---|
| 0 | 0.0 | — |
| 5 | 188.0 | 229.3 |
| 6.5 | 244.4 | 298.1 |
| 10 | 376.0 | 458.6 |
| 15 | 564.1 | 687.9 |
| 20 | 752.1 | 917.2 |
| 22 | 827.3 | 1008.9 |
| 25 | 940.1 | 1146.5 |

FIG.18

| HEATING PATTERNS | CATEGORIES | MENUS | STAGES | TEMPERATURE | TIME | STEAM GENERATING HEATER (1000W) | VAPOR HEATING HEATER (1300W) |
|---|---|---|---|---|---|---|---|
| HEATING MODE A ↓ HEATING MODE B | STEAM-GRILL (GRILL BY STEAM) RAW FOODS | SAUSAGES BACON CHICKEN (THIGHS/OTHER PARTS) HAMBURGERS PORK CHOPS | 1 PREHEATING 1<br>2 PREHEATING 2<br>3 COOKING 1<br>4 COOKING 2 | 220°C<br>250°C<br>250°C<br>250°C | PREHEATING<br>TOTAL TIME ×70%<br>TOTAL TIME ×30% | 0%<br>50%<br>50%<br>0% | 100%<br>100%<br>100%<br>100% |
| | STEAM-GRILL (GRILL BY STEAM) CONVENIENCE STORE FOODS | FRIED FISH (FROZEN) FRIED CHICKEN (FROZEN) FRIED FISH (CHILLED) FRIED CHICKEN (CHILLED) | 1 PREHEATING 1<br>2 PREHEATING 2<br>3 COOKING 1 | 220°C<br>250°C<br>250°C | PREHEATING<br>TOTAL TIME ×80%<br>TOTAL TIME ×20% | 0%<br>50%<br>50%<br>0% | 100%<br>100%<br>100%<br>100% |
| HEATING MODE A FROM BEGINNING TO END | STEAM-ROAST | ROAST CHICKEN ROAST PORK ROAST BEEF | 1 WITHOUT PREHEATING<br>2 | PRESET TEMPERATURE<br>PRESET TEMPERATURE | 30 MINUTES<br>TOTAL TIME −30MINUTES | 50%<br>0% | 100%<br>100% |
| | STEAM-BAKE CONVENIENCE STORE FOODS | PIZZA (FROZEN) FRENCH LOAF (FROZEN) LASAGNA (FROZEN) | 1 PREHEATING 1<br>2 COOKING 1<br>3 COOKING 2 | PRESET TEMPERATURE<br>PRESET TEMPERATURE<br>PRESET TEMPERATURE | PREHEATING<br>30 MINUTES<br>TOTAL TIME −30MINUTES | 0%<br>70%<br>0% | 100%<br>100%<br>100% |
| HEATING MODE B ↓ HEATING MODE A | STEAM-BAKE CAKES | BREAD PASTRIES CAKES | 1 PREHEATING 1<br>2 COOKING 1<br>3 COOKING 2<br>4 COOKING 3 | PRESET TEMPERATURE<br>PRESET TEMPERATURE<br>PRESET TEMPERATURE<br>PRESET TEMPERATURE | PREHEATING<br>TOTAL TIME ×45%<br>TOTAL TIME ×45%<br>TOTAL TIME ×10% | 0%<br>0%<br>30%<br>0% | 100%<br>60%<br>60%<br>60% |

STEAM COOKING APPARATUS

This application is a Divisional of U.S. patent application Ser. No. 10/593,234 filed on Sep. 18, 2006 now U.S. Pat. No. 7,759,615 which is a National Phase of PCT Application No. PCT/JP2004/018249 filed on Dec. 8, 2004, which claims priority under 35 U.S.C. §119(a) to Patent Application No. JP-2004-080526 filed in Japan on Mar. 19, 2004, the entire contents of each of the above-identified applications are hereby incorporated by reference.

TECHNICAL FIELD

The present invention relates to a steam cooking apparatus.

BACKGROUND ART

To date, various proposals have been made in the field of steam cooking apparatuses that perform cooking by use of steam. Examples of such steam cooking apparatuses are seen in Patent Documents 1 to 5 listed below. Patent Document 1 discloses a steam cooking apparatus wherein steam is jetted into food trays. Patent Document 2 discloses a cooking apparatus wherein superheated steam is blown into an oven chamber, or steam inside the oven chamber is turned into superheated steam by being radiation-heated. Patent Document 3 discloses a cooking apparatus wherein superheated steam is supplied to inside an entire heating chamber, or to around food, or to both. Patent Document 4 discloses an superheated steam cooking apparatus wherein superheated steam generated with a boiler is heated with reheating means provided on the blowing side of blowing means and is then blown into a chamber. Patent Document 5 discloses a heating apparatus wherein the inside of a heating box is preheated with the air that has been heated with a heater, and then cooking is performed by use of superheated steam.

Patent Document 1: JP-U1-H3-67902 (pp. 4-6 of the whole-text specification, and FIGS. 1-3)

Patent Document 2: JP-A-H11-141881 (pp. 3-5, and FIGS. 1-3)

Patent Document 3: JP-A-H8-49854 (pp. 2-3, and FIGS. 1-7)

Patent Document 4: JP-A-2001-263667 (pp. 2-4, and FIGS. 1-6)

Patent Document 5: JP-A-2002-272604 (p. 13, and FIG. 19)

DISCLOSURE OF THE INVENTION

Problems to be Solved by the Invention

The apparatuses disclosed in Patent Documents 1 to 5 perform cooking by use of superheated steam. However, in some cooking, conventional hot air or heat radiation is preferable to superheated steam as a heating medium. In view of this, it is an object of the present invention to provide a steam cooking apparatus that can appropriately perform different cooking methods for different cooking purposes by using, on a case-by-case basis, a heating mode in which heat is applied by superheated steam or a heating mode in which heat is applied by conventional hot air or heat radiation.

Means for Solving the Problem

To achieve the above object, according to the present invention, a steam cooking apparatus is provided with:

(a) a heating chamber in which food is placed;
(b) a steam generating device that generates steam to be fed to the heating chamber;
(c) a vapor heating heater that heats the steam generated with the steam generating device; and
(d) a control device that forms a cooking sequence by using, singly or in combination, a first heating mode that uses superheated steam obtained as a result of the steam being heated with the vapor heating heater and a second heating mode that uses hot air or radiation heat obtained by making the vapor heating heater produce heat without supply of steam.

With this construction, by forming a cooking sequence by using, singly or in combination, a first heating mode that uses superheated steam obtained as a result of the steam being heated with the vapor heating heater and a second heating mode that uses hot air or radiation heat obtained by making the vapor heating heater produce heat without supply of steam, it is possible to appropriately perform different cooking methods for different cooking purposes.

According to the present invention, in the steam cooking apparatus constructed as described above, a sequence is so set that, during the first half of cooking, heating is largely performed in the first heating mode, and, during the second half thereof, heating is largely performed in the second heating mode.

With this configuration, during the first half of cooking, it is possible to raise the internal temperature quickly by superheated steam, and, during the second half thereof, it is possible to cook food until brown by stopping the supply of steam.

According to the present invention, in the steam cooking apparatus constructed as described above, a sequence is so set that, during the first half of cooking, heating is largely performed in the second heating mode, and, during the second half thereof, heating is largely performed in the first heating mode.

With this configuration, it is possible to perform cooking which prohibits the addition of extra moisture during the earlier stage of cooking, for example, the baking of cakes and cookies.

According to the present invention, in the steam cooking apparatus constructed as described above, a condition associated with the sequence can be changed by an operation by a user.

With this configuration, the user is allowed to perform cooking according to their own tastes by operating to change the condition associated with the sequence.

According to the present invention, in the steam cooking apparatus constructed as described above, in a case where the sequence includes both the first and second heating modes, the duration of the first heating mode is adjusted.

With this configuration, by adjusting the duration of the first heating mode, it is possible to emphasize or weaken the characteristic of superheated steam.

According to the present invention, in the steam cooking apparatus constructed as described above, the duration of a heating mode that largely performs heating during the second half of cooking can be adjusted.

With this configuration, by adjusting the duration of the heating mode that largely performs heating during the second half of cooking, it is possible to adjust doneness of food from light to dark.

According to the present invention, in the steam cooking apparatus constructed as described above, there are provided sequence selecting means and heating time setting means or heating time/heating temperature setting means, and, when a heating time is set, the allocation of time to the heating modes in a sequence is decided based on a previously set condition.

With this configuration, when a heating time is set, the allocation of time to the heating modes in a sequence is decided based on a previously set condition. Thus, it is possible to set a cooking sequence manually.

According to the present invention, in the steam cooking apparatus constructed as described above, in a case where a sequence in which cooking is largely performed in the first heating mode is set, the duration of the first heating mode can be adjusted, and the controlled temperature of the first heating mode is so set as to be equal to or lower than 130° C.

With this configuration, it is possible to prevent erroneous setting when "warm up" or "steam" cooking is performed.

According to the present invention, in the steam cooking apparatus constructed as described above, in a case where a sequence in which cooking is largely performed in the first heating mode is set, names and/or icons of food that can explode when inner pressure is increased by microwave heating and/or food packed in packaging that blocks the passage of microwaves are indicated in means for selecting the sequence.

With this configuration, it is possible to eliminate psychological barriers to leaving food to automatic cooking by steam, the food that the user normally hesitates to leave to automatic heating by steam in fear of explosion or heating failure.

According to the present invention, in the steam cooking apparatus constructed as described above, an outer circulation passage is provided outside the heating chamber, the outer circulation passage is fitted with a blowing device that sucks in gas inside the heating chamber and then returns the sucked gas to the heating chamber, and the steam generated with the steam generating device is fed to an air stream flowing through the outer circulation passage.

With this construction, the steam generated with the steam generating device is quickly sucked into the circulated air stream. This simplifies a system of generation and circulation of steam. Furthermore, the circulated air stream permits the food to be advantageously hit by the steam intensively.

BRIEF DESCRIPTION OF DRAWINGS

[FIG. 16] A table showing the relationship between a cooking menu and a heater used for executing it.

[FIG. 17] A table showing the relationship between the amount of steam and the amount of electric power.

[FIG. 18] A table showing cooking sequences.

Figure 1:
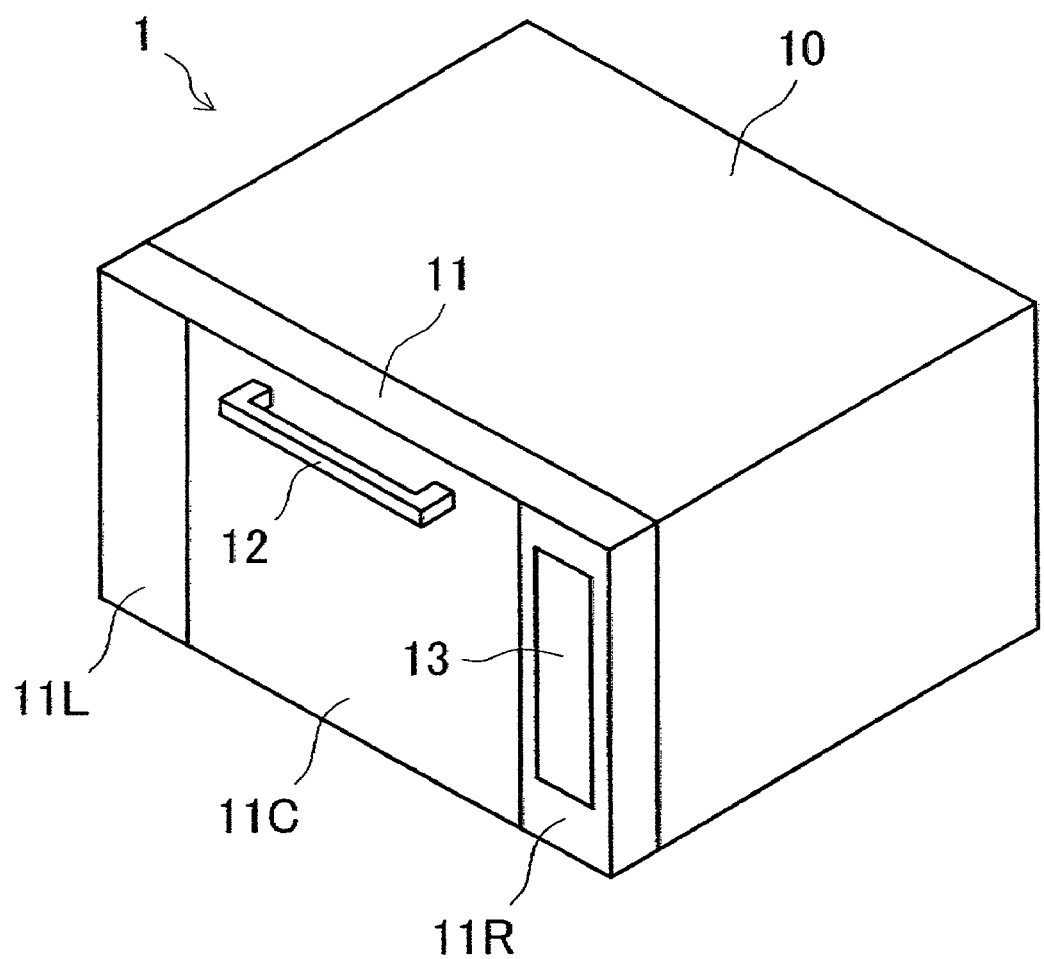
[FIG. 1] A perspective view showing the exterior of a steam cooking apparatus.

LIST OF REFERENCE SYMBOLS 1 steam cooking apparatus
20 heating chamber
30 outer circulation passage
40 sub-cavity
41 vapor heating heater
50 steam generating device
52 steam generating heater
80 control device
F food

BEST MODE FOR CARRYING OUT THE INVENTION

Hereinafter, an embodiment of the present invention will be described with reference to the accompanying drawings.

Figure 2:
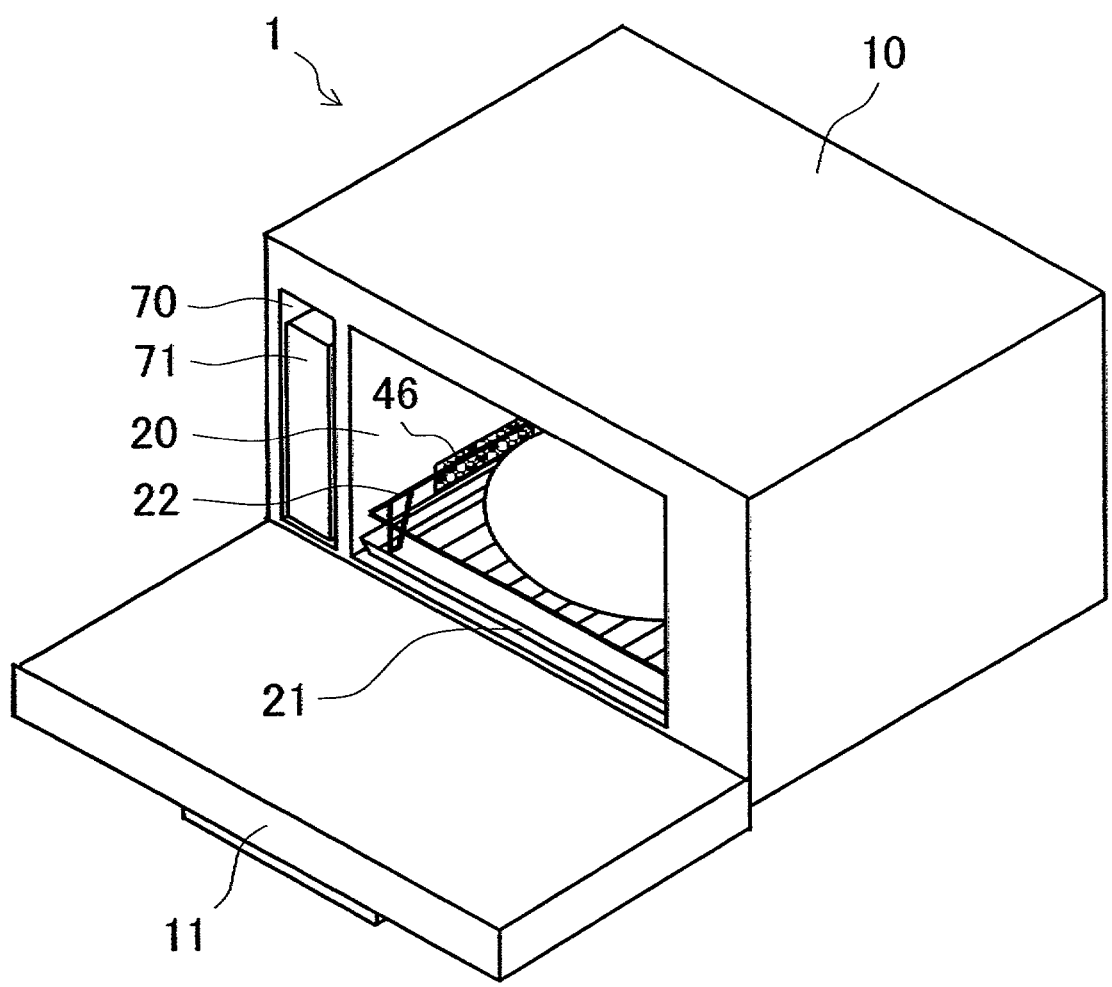
[FIG. 2] A perspective view showing the exterior of the steam cooking apparatus, with a door to a heating chamber opened.

A steam cooking apparatus 1 has a cabinet 10 in a shape of a rectangular parallelepiped. On a front face of the cabinet 10, a door 11 is provided. The door 11 rotates about a bottom edge thereof in a vertical plane. When a handle 12 fitted in an upper part of the door 11 is held and pulled frontward, the door 11 changes its position through 90 degrees from a vertical, closed state shown in FIG. 1 to a horizontal, opened state shown in FIG. 2. A middle part 11C of the door 11 has a pane of heat-resistant glass set therein to form a see-through part. On the left and right of the middle part 11C, a left-side part 11L and a right-side part 11R, each finished with a metal decoration plate, are arranged symmetrically. On the right-side part 11R, an operation panel 13 is provided.

When the door 11 is opened, the front face of the cabinet 10 appears. In the part of the cabinet 10 corresponding to the middle part 11C of the door 11, a heating chamber 20 is provided. In the part of the cabinet 10 corresponding to the left-side part 11L of the door 11, a water tank chamber 70 is provided. In the part of the cabinet 10 corresponding to the right-side part 11R of the door 11, a control circuit board is arranged inside, with no opening provided in front thereof.

The heating chamber 20 has a shape of a rectangular parallelepiped, and is completely open in the front face thereof at which it faces the door 11. The other faces of the heating chamber 20 are formed of stainless steel plates. Around the heating chamber 20, heat insulation is applied. On a floor surface of the heating chamber 20, a tray 21 formed of a stainless steel plate is placed, and, above the tray 21, a rack 22 formed of stainless steel wire is placed for placing food F thereon.

Figure 4:
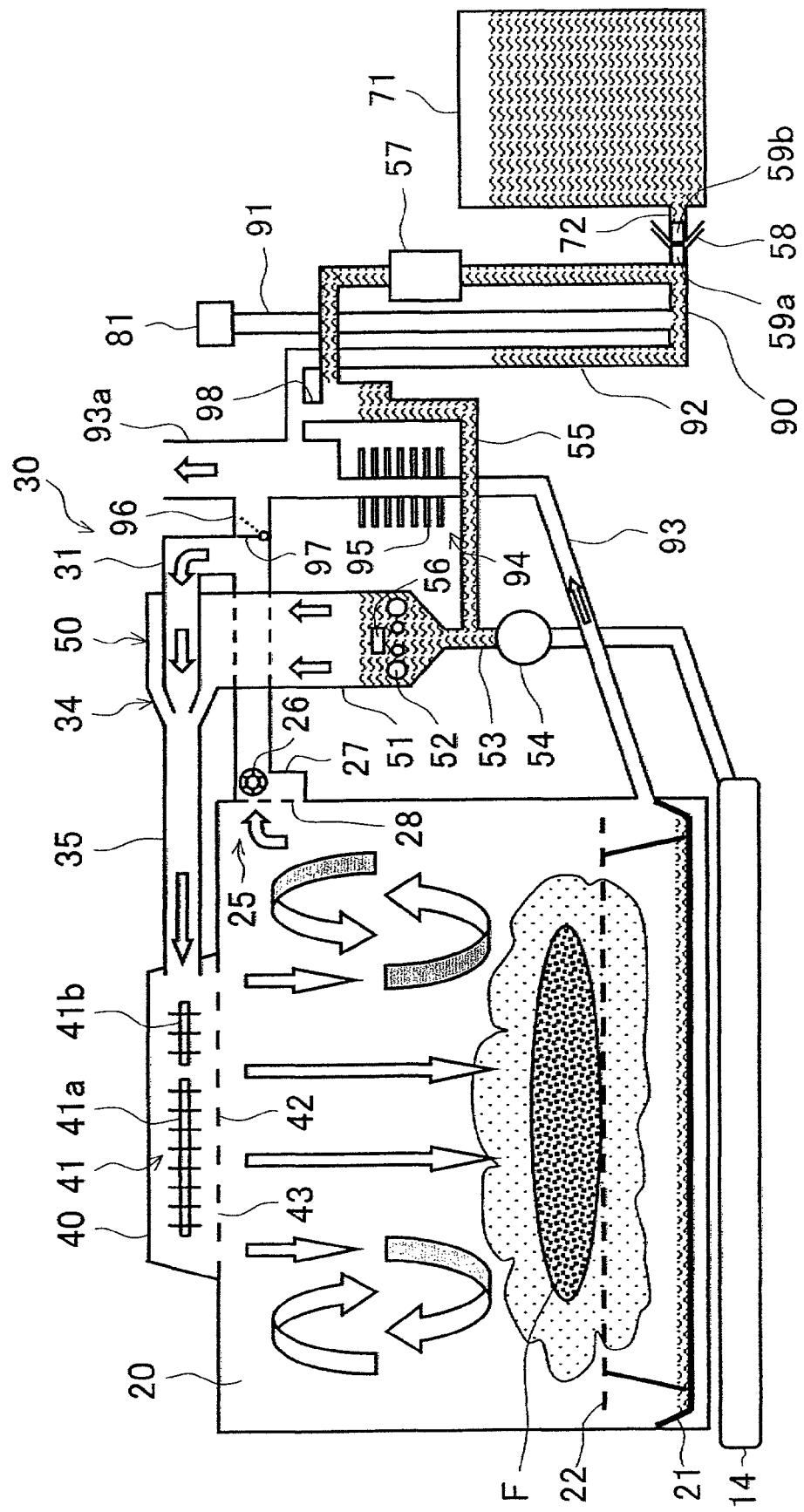
[FIG. 4] A diagram illustrating the basic construction of an internal mechanism of the steam cooking apparatus.

Inside the heating chamber 20, steam is present that is circulated through an outer circulation passage 30 shown in FIG. 4 (initially, inside the heating chamber 20, air is dominant; when steam cooking is started, however, the air is gradually replaced with steam; throughout the following description, it is assumed that the gas inside the heating chamber 20 has completely been replaced with steam).

Figure 3:
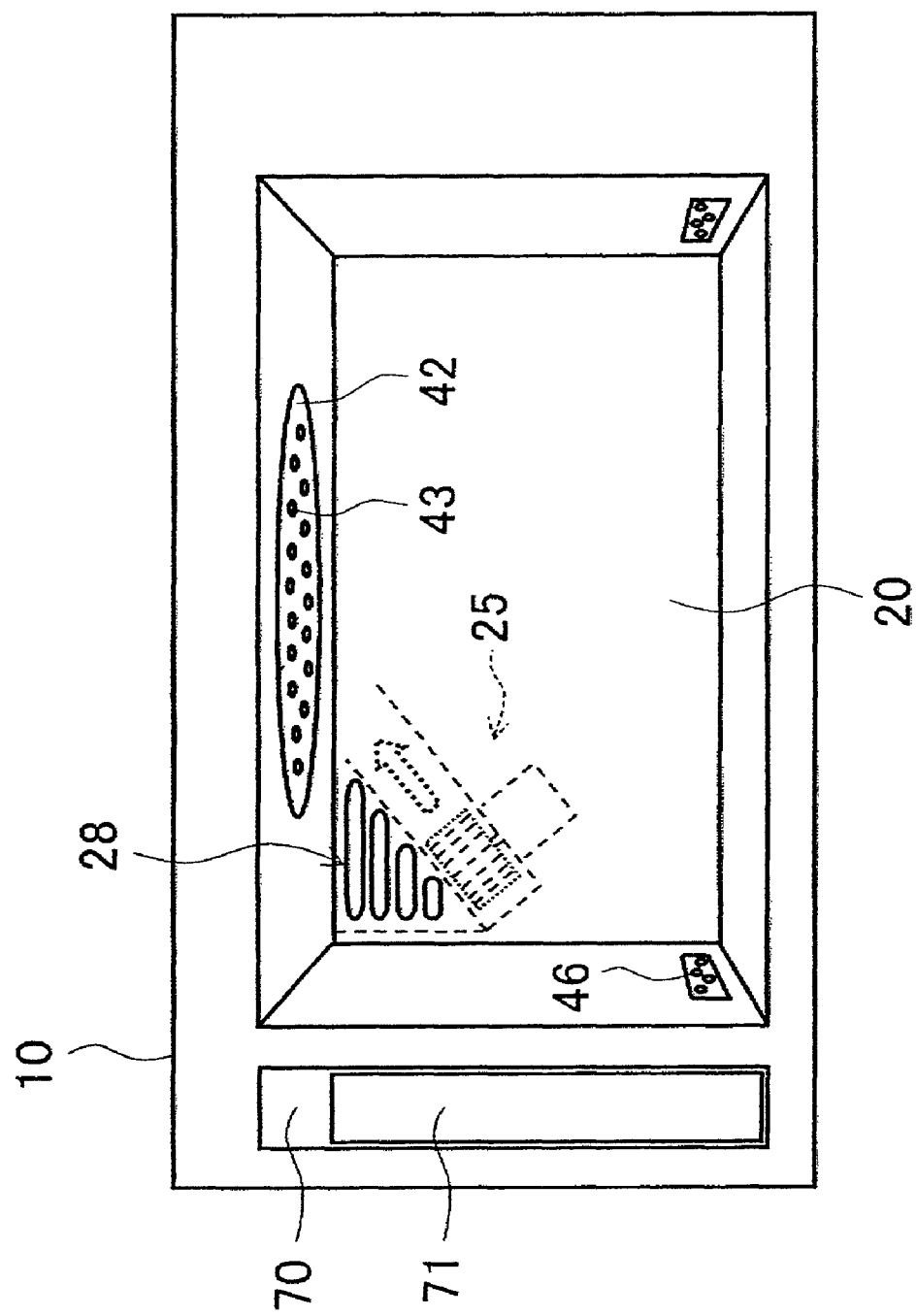
[FIG. 3] A front view of the steam cooking apparatus, with the door to the heating chamber removed.

The outer circulation passage 30 starts with a suction port 28 provided in a corner of an upper part of a rear wall of the heating chamber 20. In this embodiment, as shown in FIG. 3, the suction port 28 is arranged in the upper left corner of the rear wall. The suction port 28 consists of a plurality of parallel slits arranged above one another. These slits are increasingly long upward and increasingly short downward so that together they form an opening in the shape of a right-angled triangle (see FIG. 11). The right-angled corner of the triangle fits the corner of the rear wall of the heating chamber 20. Thus, the suction port 28 is increasingly widely open toward the upper edge of the rear wall of the heating chamber 20, and is increasingly widely open toward the left edge thereof.

Figure 11:
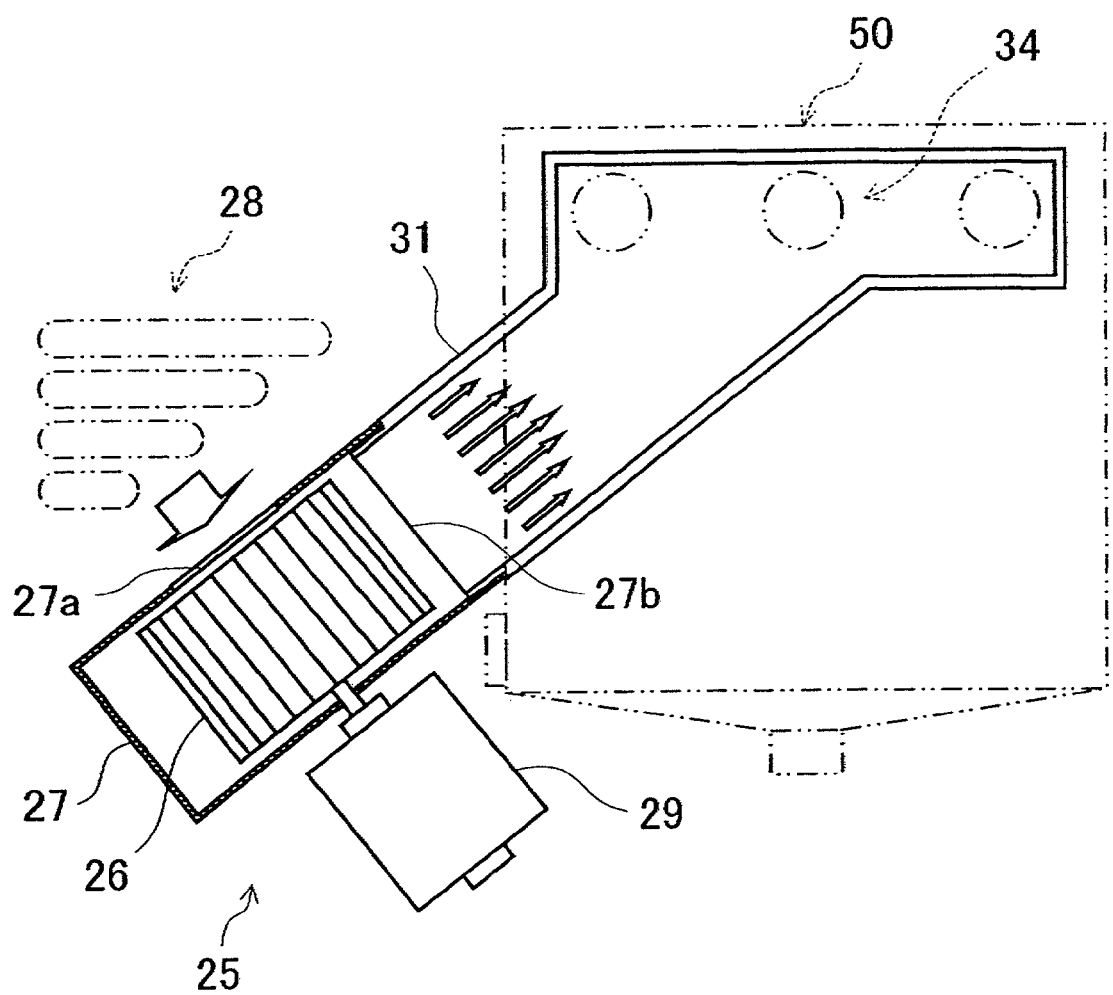
[FIG. 11] A vertical sectional view of a blowing device.

The suction port 28 is followed by a blowing device 25 that produces an air stream that flows through the outer circulation passage 30. The blowing device 25 is arranged close to the outer surface of a side wall of the heating chamber 20. Selected as this side wall here is the rear wall of the heating chamber 20. As shown in FIG. 11, the blowing device 25 is provided with a centrifugal fan 26, a fan casing 27 for housing it, and a motor 29 for rotating the centrifugal fan 26. As the centrifugal fan 26, a sirocco fan can be used. As the motor 29, a direct current motor capable of high-speed rotation can be used. The fan casing 27 is fixed on the outer surface of the rear wall of the heating chamber 20, on the lower right of the suction port 28.

The fan casing 27 has a suction port 27a and an outlet port 27b. The outlet port 27b is directed in a specific direction. The meaning of this direction will be explained later.

Along the outer circulation passage 30, the blowing device 25 is followed by a steam generating device 50. The steam generating device 50 will be described in detail later. Like the blowing device 25, the steam generating device 50 is arranged close to the outer surface of the rear wall of the heating chamber 20; however, while the blowing device 25 is arranged rather in a left part of the heating chamber 20, the steam generating device 50 is arranged on the center line of the heating chamber 20.

The part of the outer circulation passage 30 leading from the outlet port 27b of the fan casing 27 to the steam generating device 50 is built with a duct 31; the part of the outer circulation passage 30 leading further on from the steam generating device 50 is built with a duct 35. The duct 35 is connected to a sub-cavity 40 provided adjacent to the heating chamber 20.

The sub-cavity 40 is provided above a ceiling part of the heating chamber 20 and, as seen in a plan view, above a central part of the ceiling part. The sub-cavity 40 has a circular shape as seen in a plan view, and, inside the sub-cavity 40, a vapor heating heater 41 is arranged as means for heating steam. The vapor heating heater 41 is composed of a main heater 41a and a sub heater 41b, of which each is built with a sheath heater. In the ceiling part of the heating chamber 20, an opening as large as the sub-cavity 40 is formed, and, in this opening, a floor panel 42 that forms a floor surface of the sub-cavity 40 is fitted.

In the floor panel 42, a plurality of upper jet holes 43 are formed. The upper jet holes 43 consist of small holes that are each directed straight downward and that are so located as to spread largely over the entire surface of the panel. Here, the upper jet holes 43 are so located as to spread within a plane, that is, two-dimensionally; it is, however, also possible to form elevations and depressions on the floor panel 42 so that the locations of the upper jet holes 43 spread quasi-three-dimensionally.

Both upper and lower surfaces of the floor panel 42 are finished to be dark-colored through surface treatment such as paining. Incidentally, the floor panel 42 may be formed of a metal material whose color grows dark as use progresses; instead, the floor panel 42 may be formed of a dark-colored ceramic molding.

Instead of the floor surface of the sub-cavity 40 being formed with the floor panel 42 separately provided, the ceiling plate of the heating chamber 20 may, as it is, be shared as the floor surface of the sub-cavity 40. In this case, the part of the ceiling plate corresponding to the sub-cavity 40 has the upper jet holes 43 formed therein, and has upper and lower surfaces thereof finished to be dark-colored.

Figure 5:
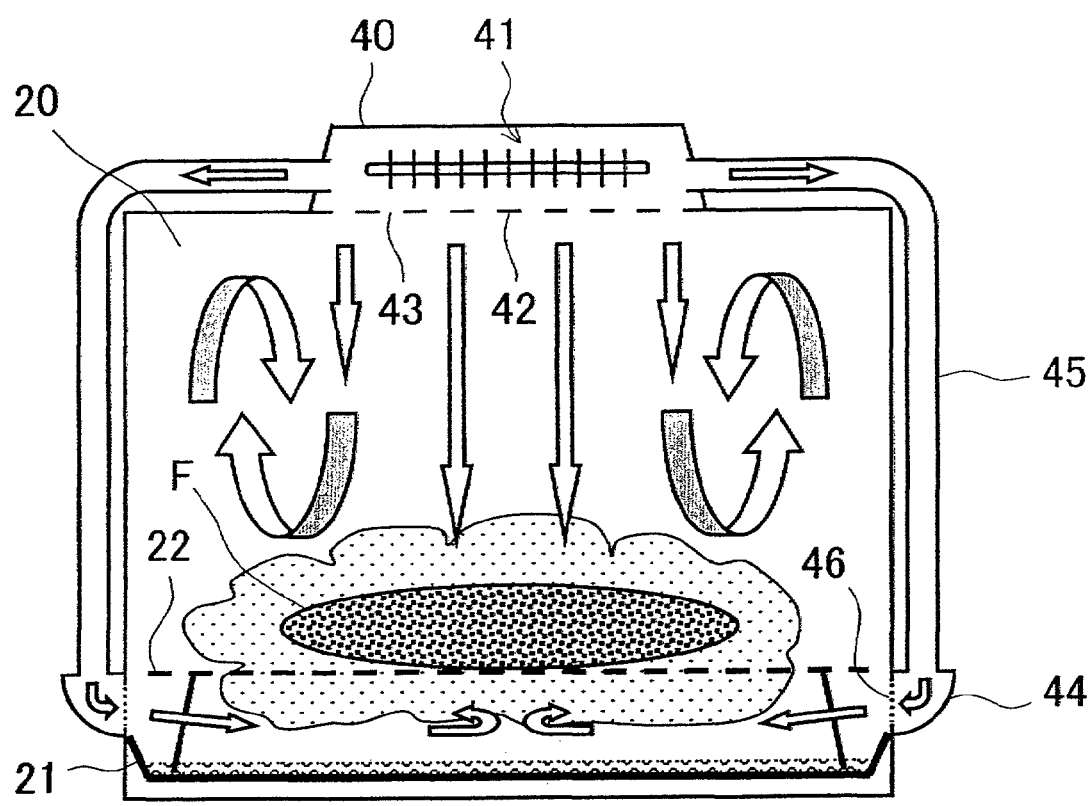
[FIG. 5] A diagram illustrating the basic construction of the internal mechanism of the steam cooking apparatus, as viewed from a direction perpendicular to FIG. 4.

Outside the left and right side walls of the heating chamber 20, small sub-cavities 44 are provided as shown in FIG. 5. The sub-cavities 44 are connected to the sub-cavity 40 through ducts 45 to receive steam from the sub-cavity 40 (see FIGS. 5 and 6). The ducts 45 are formed as pipes having a circular cross-sectional shape, and are preferably formed of pipes of stainless steel.

In the lower parts of the side walls of the heating chamber 20, a plurality of side jet holes 46 are formed in positions corresponding to the sub-cavities 44. The side jet holes 46 are small holes that are each directed toward the food F placed inside the heating chamber 20, more precisely, toward under the food F. The side jet holes 46 permit steam to be jetted out therethrough toward the food F placed on the rack 22. The heights and directions of the side jet holes 46 are so set that the steam blown out reaches under the food F. Moreover, the side jet holes 46 are so positioned and/or directed that the steam blown out from the left and right sides meets under the food F.

The side jet holes 46 may be formed in a separately provided panel, or may be formed in the side walls of the heating chamber 20 themselves, with small holes formed directly therein. In this respect, what has been stated above in connection with the upper jet holes 43 equally applies. In contrast to the sub-cavity 40, however, the parts corresponding to the sub-cavities 44 need not be finished to be dark-colored.

The total area of the side jet holes 46 at the left and right sides is made larger than the total area of the upper jet holes 43. Since the side jet holes 46 thus have a large total area, a large amount of steam needs to be fed thereto. To achieve this, for each sub-cavity 44, a plurality of ducts 45 (in the figures, four of them) are provided.

Next, the structure of the steam generating device 50 will be described. The steam generating device 50 is provided with a barrel shape pot 51 arranged with the center line thereof vertical. The pot 51 is laterally compressed to make a flat, elongate horizontal cross section, the shape of which is such as rectangular, oval, or the like. The pot 51 may be formed of any material so long as it is heat-resistant. Specifically, the pot 51 may be formed of a metal, synthetic resin, or ceramic, or may be formed of a combination of different materials.

Figure 6:
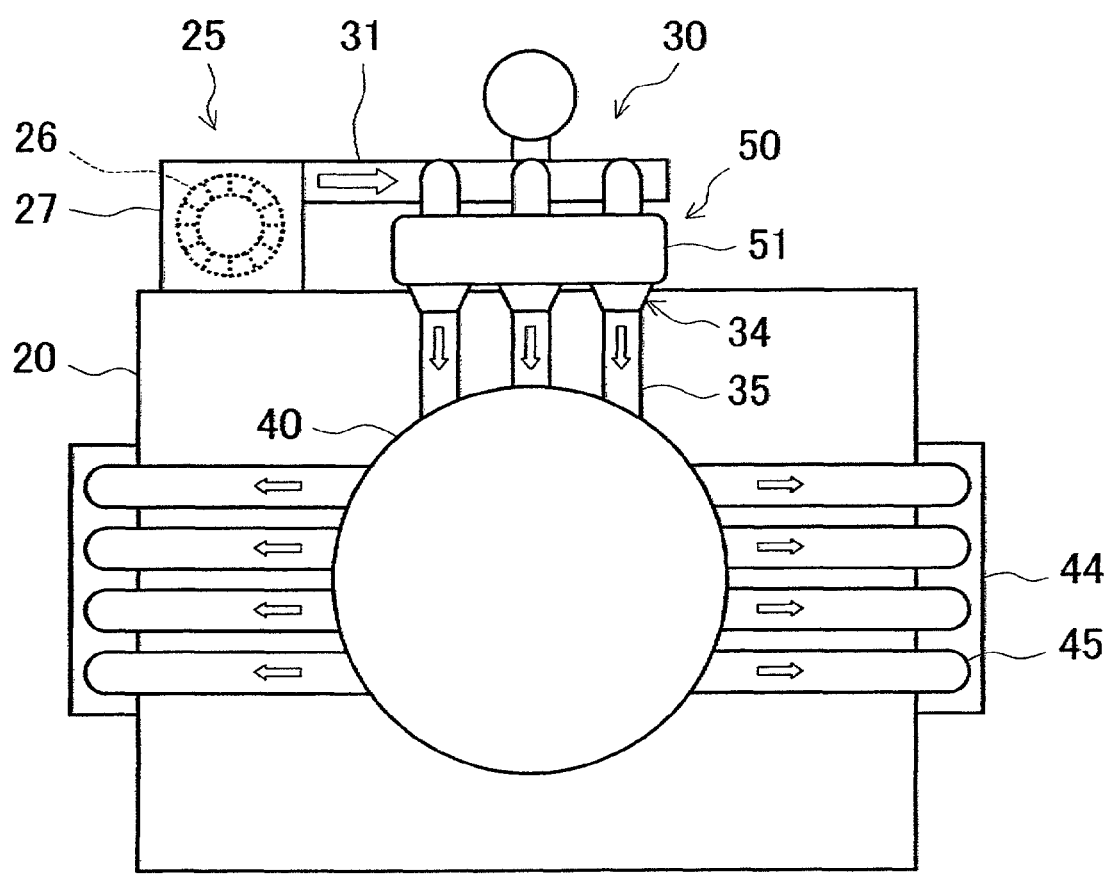
[FIG. 6] A top view of the heating chamber.
Figure 7:
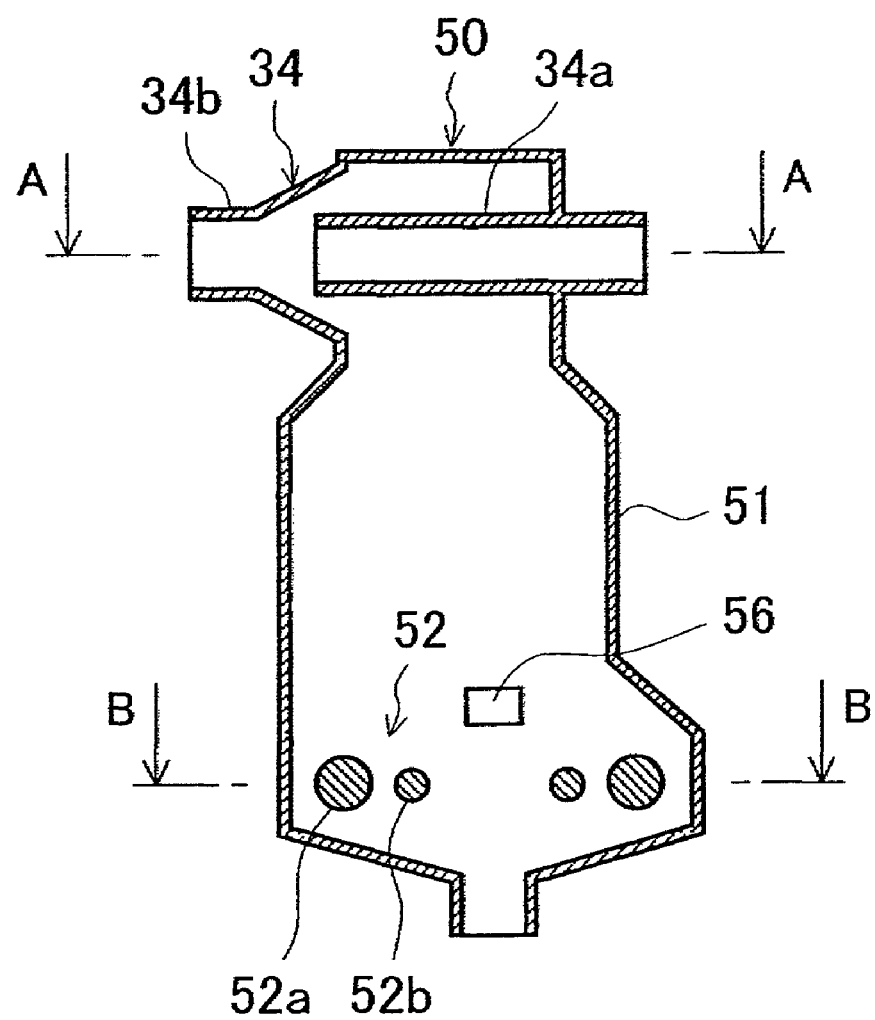
[FIG. 7] A vertical sectional view of a steam generating device.
Figure 8:
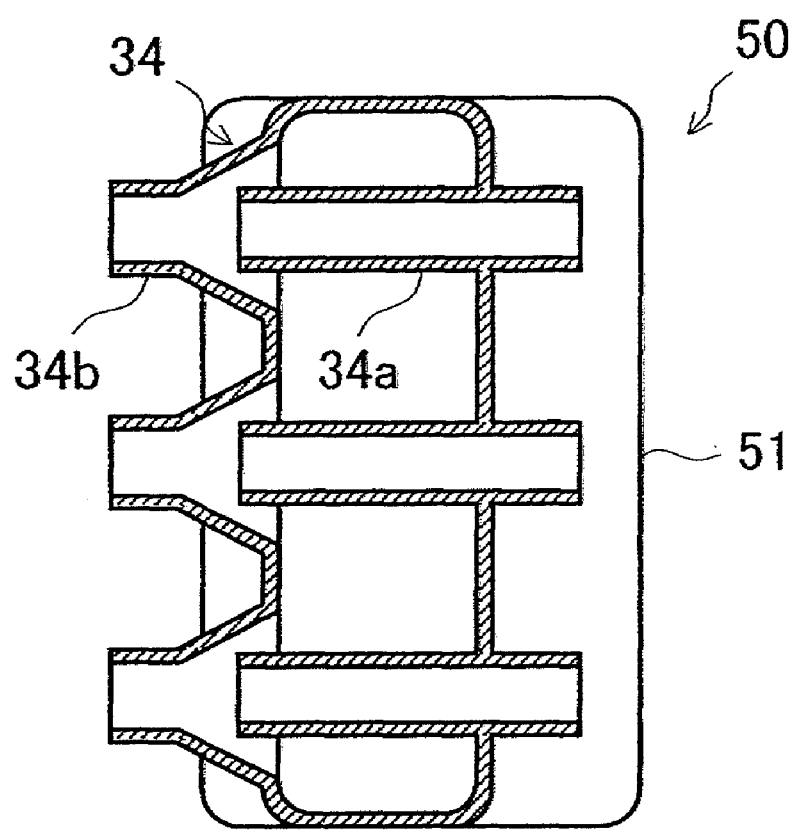
[FIG. 8] A horizontal sectional view taken on the line A-A of FIG. 7.

As shown in FIG. 6, the steam generating device 50 is arranged with one flat side of the pot 51 parallel to the rear wall of the heating chamber 20. In this way, the steam generating device 50 can be arranged even in a case where there is only a narrow gap left between the outer surface of the heating chamber 20 and the inner surface of the cabinet 10. This helps reduce the just-mentioned gap and thereby make the cabinet 10 compact; thus, the space inside the cabinet 10 can be used more efficiently.

Figure 9:
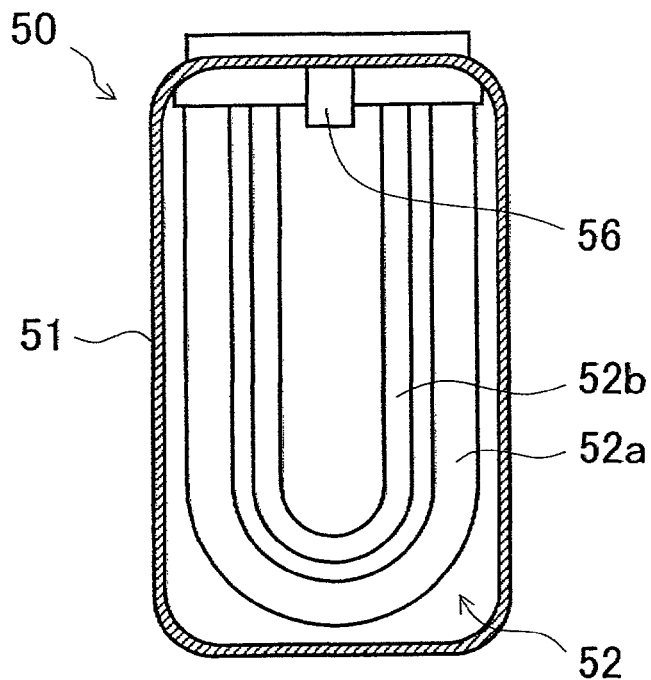
[FIG. 9] A horizontal sectional view taken on the line B-B of FIG. 7.
Figure 10:
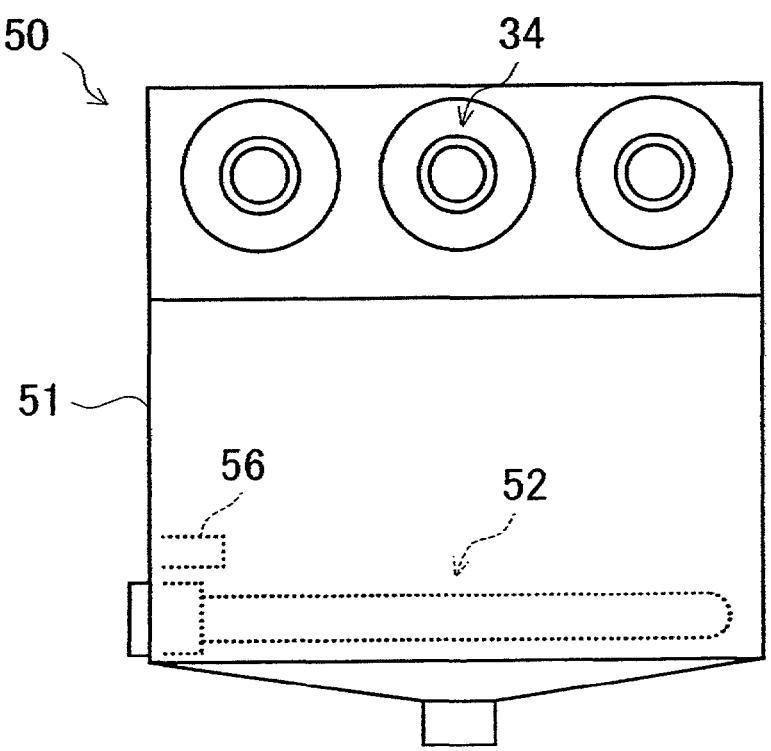
[FIG. 10] A front view of the steam generating device.

Water put in the pot 51 is heated with a steam generating heater 52 arranged in a bottom part of the pot 51. The steam generating heater 52 is built with a sheath heater, and is immersed in the water inside the pot 51 to directly heat it. As shown in FIG. 9, since the pot 51 is flat as seen in a plan view, the steam generating heater 52 is bent in a U shape, as seen in a plan view, to fit the inner surface of the pot 51. Like the vapor heating heater 41 provided in the sub-cavity 40, the steam generating heater 52 is composed of a main heater 52a and a sub heater 52b, with the former arranged outside and the latter inside. The main and sub heaters have different cross-sectional diameters, the main heater 52a being thicker than the sub heater 52b.

When arranging a sheath heater within a given area, as compared with arranging a sheath heater bent in a circular shape in a circular area, arranging a sheath heater bent in a flat shape like a U shape in a rectangular or oval area permits the sheath heater to be longer. That is, as compared with when a sheath heater bent in a circular shape is placed inside a pot having a circular cross-sectional shape, when a sheath heater bent in a flat shape like a U shape is placed inside a pot having an elongate horizontal cross-sectional shape, the ratio of the length of the sheath heater to a given amount of water is greater, thus the surface area of the sheath heater is larger, therefore more electric power can be used, and also heat is more easily conducted to water. Thus, with the steam generating device 50 of the embodiment, water can be heated quickly.

Above the pot 51, a steam suction portion is formed that permits steam to be sucked into the air stream circulating through the outer circulation passage 30. The steam suction portion is built with a steam suction ejector 34 that is formed to penetrate the pot 51 from one flat side to the opposite flat side. Here, as the steam suction ejector 34, three of them are arranged side by side, parallel to one another, at predetermined intervals, and at the same level.

Each steam suction ejector 34 is composed of an inner nozzle 34a and an outer nozzle 34b that surrounds the outlet end thereof. The steam suction ejector 34 extends in a direction in which it crosses the axis line of the pot 51. In this embodiment, the crossing angle is perpendicular, that is, the steam suction ejector 34 is arranged horizontally. To the inner nozzle 34a, the duct 31 is connected and, to the outer nozzle 34b, the duct 35 is connected. The steam suction ejector 34 is arranged at approximately the same height as the sub-cavity 40, and the duct 35 extends approximately horizontally. Connecting the steam suction portion and the sub-cavity 40 rectilinearly with the horizontal duct 35 in this way helps minimize the path of the part of the outer circulation passage 30 leading further on from the steam suction portion.

Having passed through the steam generating device 50, the outer circulation passage 30 divides into three paths through the three steam suction ejectors 34 and the ducts 35 following them. Thus, the pressure loss across the paths is reduced, the amount of steam circulated can be increased, and the steam can be quickly mixed with the gas flowing through the outer circulation passage 30.

As described above, the three steam suction ejectors 34 provided above the pot 51 form a steam suction portion that occupies a space having a flat vertical cross-sectional shape, and cover a wide area. Thus, the area where suction of steam takes place is widened, the generated steam is sucked evenly, and the sucked steam is quickly sent out, further enhancing the steam generating performance of the steam generating device 50. Moreover, since the three steam suction ejectors 34 are arranged side by side at the same level, even in a case where there is no ample space in the height direction, a large amount of steam can be transported.

Now, the direction of the fan casing 27 of the blowing device 25 will be explained. The suction port 27a and the outlet port 27b of the fan casing 27 are at right angles to each other. The fan casing 27 is so positioned and angled that the outlet port 27b is directed toward the steam suction ejectors 34 that serve as a steam suction portion (see FIG. 11). Between the outlet port 27b and the steam suction ejector 34, the duct 31 provides an air passage, and, between the suction port 28 and the suction port 27a, an unillustrated duct provides an air passage.

With this construction, the gas sucked out through the suction port 28 reaches the steam suction ejector 34, taking the shortest air-blowing route offered by the centrifugal fan. This helps shorten the length of the outer circulation passage 30. This in turn reduces the pressure loss across the outer circulation passage 30 when air is blown therethrough and thereby enhances the energy efficiency of the outer circulation passage 30, and also reduces the heat-dissipating area of the outer circulation passage 30 and thereby reduces the heat loss. Altogether, the energy efficiency with which steam is circulated through the outer circulation passage 30 is enhanced.

As indicated by arrows shown in FIG. 11, the air stream blown out through the outlet port 27b flows at the highest speed at the center thereof, and flows at increasingly lower speed as it becomes closer to the inner surface of the duct 31. This is caused by the friction between the inner surface of the duct 31 and the gas. The part of the air stream that flows at the highest speed is directed toward the middle one of the three steam suction ejectors 34 arranged side by side. This helps establish a direct connection relationship between the middle steam suction ejector 34 and the outlet port 27b.

What is referred to as the "direct connection relationship" means that the air stream blown out through the outlet port 27b reaches the steam suction ejector 34 without straying from the route. Such a "direct connection relationship" is established not only for the middle steam suction ejector 34 but also for the steam suction ejectors 34 arranged on the left and right of the middle steam suction ejector 34. This is made possible by appropriately setting the width and angle of the part of the duct 31 where it is connected to the outlet port 27b. With this construction, the steam suction ejectors 34 suffer less from variation in the volume of air distributed thereto. Also, this permits the steam suction ejectors 34 to suck in the steam evenly from a wide area, enhancing the steam suction efficiency.

Back in FIG. 4, the pot 51 has a funnel-shaped bottom part, from which a water drain pipe 53 runs downward. Midway along the water drain pipe 53, a water drain valve 54 is provided. The water drain pipe 53 has a lower part thereof bent so as to run toward a lower part of the heating chamber 20 with a slope of a predetermined angle. Under the heating chamber 20, a water drain tank 14 is so arranged as to receive the lower end of the water drain pipe 53. The water drain tank 14 can be taken out of the cabinet 10 through the front face thereof so as to dispose of the water collected therein.

The pot 51 is fed with water through a water feed passage. The water feed passage is built with a water feed pipe 55 that connects a water tank 71 to the water drain pipe 53. The water feed pipe 55 is connected to the water drain pipe 53 at a position higher than the water drain valve 54. The water feed pipe 55, starting from the position where it is connected to the water drain pipe 53, first ascends and then descends to form an inverted U shape. Midway in the descending part of the water feed pipe 55, a water feed pump 57 is provided. The water feed pipe 55 leads to a laterally-facing funnel-shaped inlet port 58. A horizontal connection pipe 90 connects the water feed pipe 55 to the inlet port 58.

Inside the pot 51, a pot water level sensor 56 is arranged. The water level sensor is located slightly higher than the steam generating heater 52.

Into the water tank chamber 70, a water tank 71 in the shape of a rectangular parallelepiped having a small lateral width is inserted. From a bottom part of the water tank 71 runs a water feed pipe 72, which is connected to the inlet port 58.

When the water tank 71 is pulled out of the water tank chamber 70, the water feed pipe 72 disconnects from the inlet port 58, and thus, unless some measure is taken, the water inside the water tank 71 and the water in the water feed pipe 55 spills out. To prevent this, the inlet port 58 and the water feed pipe 72 are fitted with coupling plugs 59a and 59b. When the water feed pipe 72 is connected to the inlet port 58 as shown in FIG. 4, the coupling plugs 59a and 59b couple to each other to permit passage of water; when the water feed pipe 72 is disconnected from the inlet port 58, the coupling plugs 59a and 59b are each shut to prevent water from spilling out of the water feed pipe 55 and the water tank 71.

To the connection pipe 90 are connected, in order from the side of the inlet port 58, the water feed pipe 55, a pressure detection pipe 91, and a pressure release pipe 92. At the upper end of the pressure detection pipe 91, a water level sensor 81 is provided. The water level sensor 81 measures the water level inside the water tank 71. An upper part of the pressure release pipe 92 is horizontally bent, and is connected to an exhaust passage through which to let steam escape out of the heating chamber 20.

The exhaust passage is built with an exhaust duct 93 and a vessel 93a, of which the former forms a front part thereof and the latter a rear part. The exhaust duct 93 is longer than the vessel 93a. The exhaust duct 93 extends from a side wall of the heating chamber 20, and runs while gradually increasing its height to eventually lead to the vessel 93a. The vessel 93a leads out of the apparatus, i.e. out of the cabinet 10. The vessel 93a is formed of a synthetic resin, and has a larger cross-sectional area of the flow passage than that of the exhaust duct 93.

The entrance to the exhaust duct 93 is open toward the inside of the heating chamber 20. Thus, if there is any liquid flowing downward, in the direction opposite to the exhaustion direction, through the exhaust duct 93, it enters the heating chamber 20 and is collected at the bottom thereof. The liquid collected at the bottom of the heating chamber 20 can be checked at a glance, eliminating the possibility of it not being disposed of.

At least part of the exhaust duct 93 is formed into a heat dissipating portion 94. The heat dissipating portion 94 is built with a metal pipe having a plurality of radiating fins 95 on the outside thereof.

The vessel 93a passes by the duct 31. Here, between the duct 31 and the vessel 93a, a connection passage is provided. This connection passage is built with a connection duct 96, and, inside this connection duct 96, an electrically driven damper 97 is provided. Normally, the damper 97 keeps the connection duct 96 closed.

The highest part of the water feed pipe 55 leads, through an overflow water passage, to the vessel 93a. The overflow water passage is built with an overflow water pipe 98 of which one end is connected to the water feed pipe 55 and of which the other end is connected to the upper-end horizontal part of the pressure release pipe 92. The height of the position at which the pressure release pipe 92 is connected to the vessel 93a is the overflow level. The overflow level is set to be higher than the normal water level inside the pot 51 and lower than the steam suction ejector 34.

The vessel 93a is formed into a complex shape to receive various ducts and pipes such as the exhaust duct 93, the connection duct 96, and the overflow water pipe 98, but the vessel 93a itself is seamless because it is formed of a synthetic resin. This prevents the water from leaking out through the seam.

Figure 13:
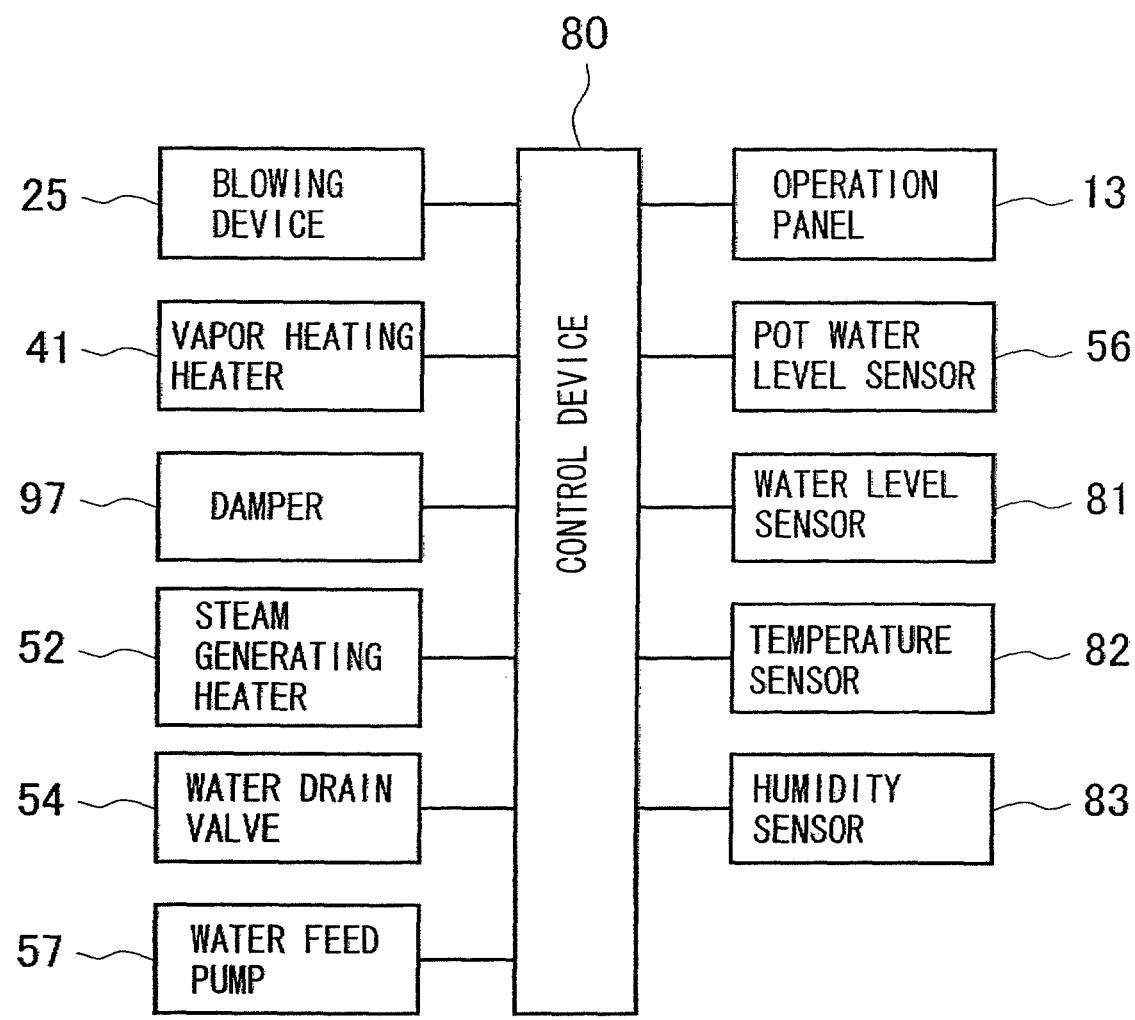
[FIG. 13] A block diagram of a control portion.

The operation of the steam cooking apparatus 1 is controlled by a control device 80 shown in FIG. 13. The control device 80 includes a microprocessor and a memory, and controls the steam cooking apparatus 1 according to a predetermined program. The status of control is indicated in a display portion on the operation panel 13. The control device 80 receives operation instructions from various operation keys arranged on the operation panel 13 as they are operated. More specifically, the various operation keys arranged on the operation panel 13 permit selection of a cooking sequence or setting of sequence conditions. That is, the operation panel 13 is used as cooking sequence selecting means and/or cooking sequence conditions setting means. On the operation panel 13, a sound generating device is also arranged that generates various sounds.

Connected to the control device 80 is not only the operation panel 13 but also the blowing device 25, the vapor heating heater 41, the damper 97, the steam generating heater 52, the water drain valve 54, the pot water level sensor 56, the water feed pump 57, and the water level sensor 81. Further connected to the control device 80 are: a temperature sensor 82 for sensing the temperature inside the heating chamber 20; and a humidity sensor 83 for sensing the humidity inside the heating chamber 20.

The steam cooking apparatus 1 is operated and operates as follows. First, the door 11 is opened, then the water tank 71 is pulled out of the water tank chamber 70, and then water is poured into the tank through an unillustrated water feed port thereof. Filled with water, the water tank 71 is then pushed back into the water tank chamber 70 and is set in position. When the end of the water feed pipe 72 is confirmed to have been securely connected to the inlet port 58 of the water feed passage, food F is placed inside the heating chamber 20, and the door 11 is closed. Then, a power key on the operation panel 13 is pressed to turn the power on, and the operation keys provided on the operation panel 13 are operated to select a cooking menu and make various settings.

When the water feed pipe 72 is connected to the inlet port 58, the water tank 71 leads to the pressure detection pipe 91, and the water level sensor 81 detects the water level inside the water tank 71. If the water amount is found to be sufficient to execute the selected cooking menu, the control device 80 starts to generate steam; if the amount of water inside the water tank 71 is found to be insufficient to execute the selected cooking menu, the control device 80 indicates the corresponding warning on the operation panel 13. In this case, the control device 80 does not start to generate steam until the shortage of water is overcome.

When it becomes possible to start to generate steam, the water feed pump 57 starts to operate, and starts to feed water to the steam generating device 50. At this point, the water drain valve 54 is closed.

Water collects inside the pot 51 from the bottom up. When the water level is detected to have reached a predetermined level by the pot water level sensor 56, water stops being supplied. Now, electric power starts to be supplied to the steam generating heater 52. The steam generating heater 52 heats the water inside the pot 51 directly.

At the same time that electric power starts to be supplied to the steam generating heater 52, or when the water inside the pot 51 is found to have reached a predetermined temperature, electric power starts to be supplied also to the blowing device 25 and the vapor heating heater 41. The blowing device 25 sucks in, though the suction port 28, the steam in the heating chamber 20, and blows it out into the steam generating device 50. Here, since the blowing out of steam is achieved with the centrifugal fan 26, a higher pressure can be produced than with a propeller fan. In addition, since the centrifugal fan 26 is rotated at a high speed with a direct current motor, the air stream produced has an extremely high flow speed.

The high flow speed of the air stream here helps reduce the cross-sectional area of the flow passage in comparison with the flow rate. This permits the pipe that largely forms the outer circulation passage 30 to have a circular cross-sectional shape and a comparatively small diameter, and thus helps give the outer circulation passage 30 a smaller surface area than when it is formed as a duct having a rectangular cross-sectional shape. Thus, although hot steam passes through it, the outer circulation passage 30 dissipates less heat, enhancing the energy efficiency of the steam cooking apparatus 1. In a case where the outer circulation passage 30 is wrapped with a heat insulating material, the amount of it needed can be reduced.

At this point, the damper 97 keeps closed the duct 96 leading from the duct 31 to the vessel 93*a*. The steam blown out of the blowing device 25 under pressure flows through the duct 31 into the steam suction ejector 34, then flows through the duct 35 into the sub-cavity 40.

When the water in the pot 51 boils, it generates saturated steam at 100° C. and at one atmosphere. The saturated steam enters, through the steam suction ejector 34, the outer circulation passage 30. The ejector structure here permits the saturated steam to be sucked in quickly and mixed with the circulated air stream. Moreover, the ejector structure prevents the steam generating device 50 from being acted upon by a pressure, and thereby permits the saturated steam to be discharged freely.

The steam that has exited from the steam suction ejector 34 flows through the duct 35 into the sub-cavity 40. The steam that has entered the sub-cavity 40 is heated to 300° C. by the vapor heating heater 41, and is thus turned into superheated steam. Part of the superheated steam is jetted out downward through the upper jet holes 43. Another part of the superheated steam flows through the ducts 45 into the sub-cavities 44, and is then jetted out sideways through the side jet holes 46.

Figure 14:
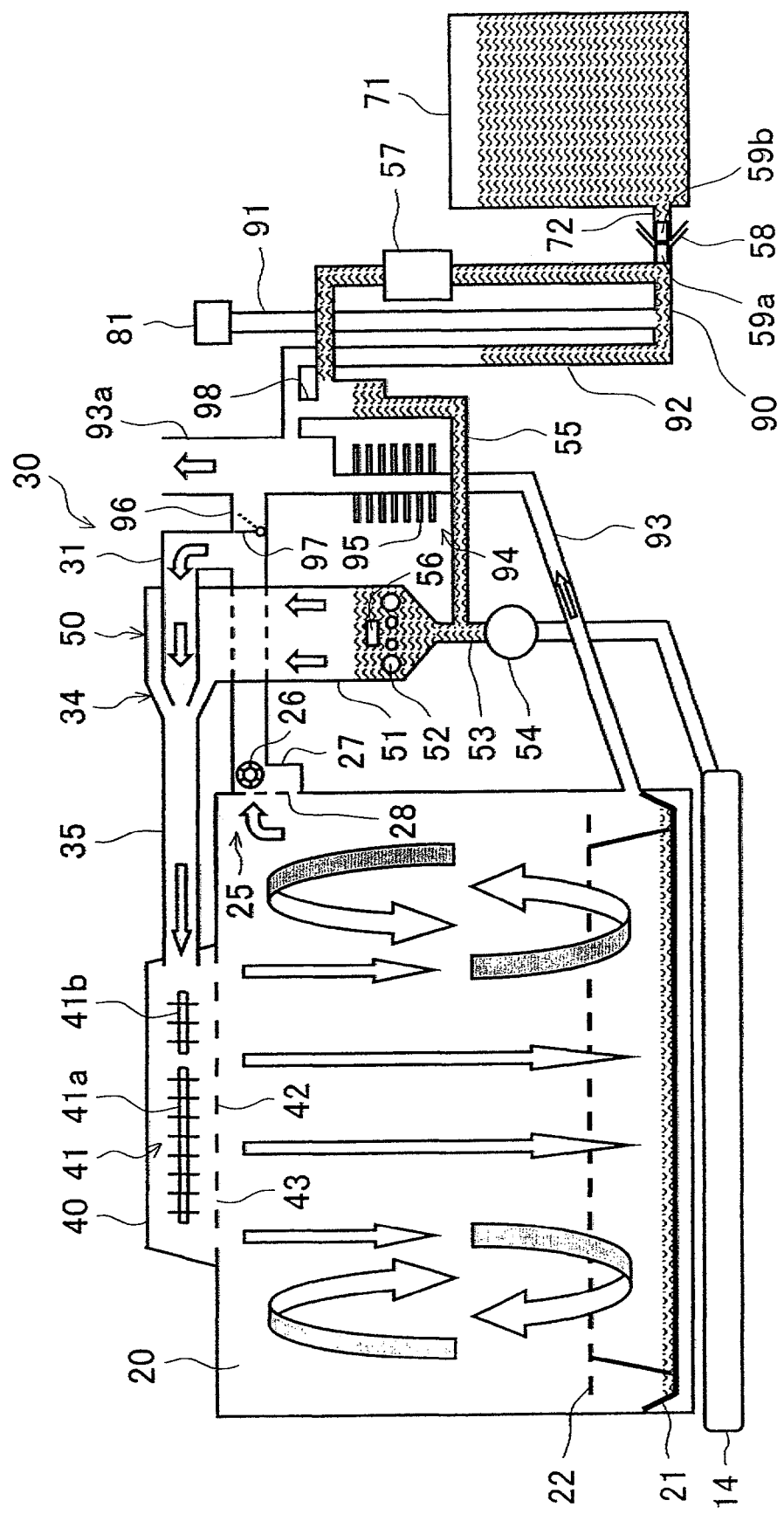
[FIG. 14] A diagram similar to FIG. 4, showing the basic construction in a state different from that shown in FIG. 4.
Figure 15:
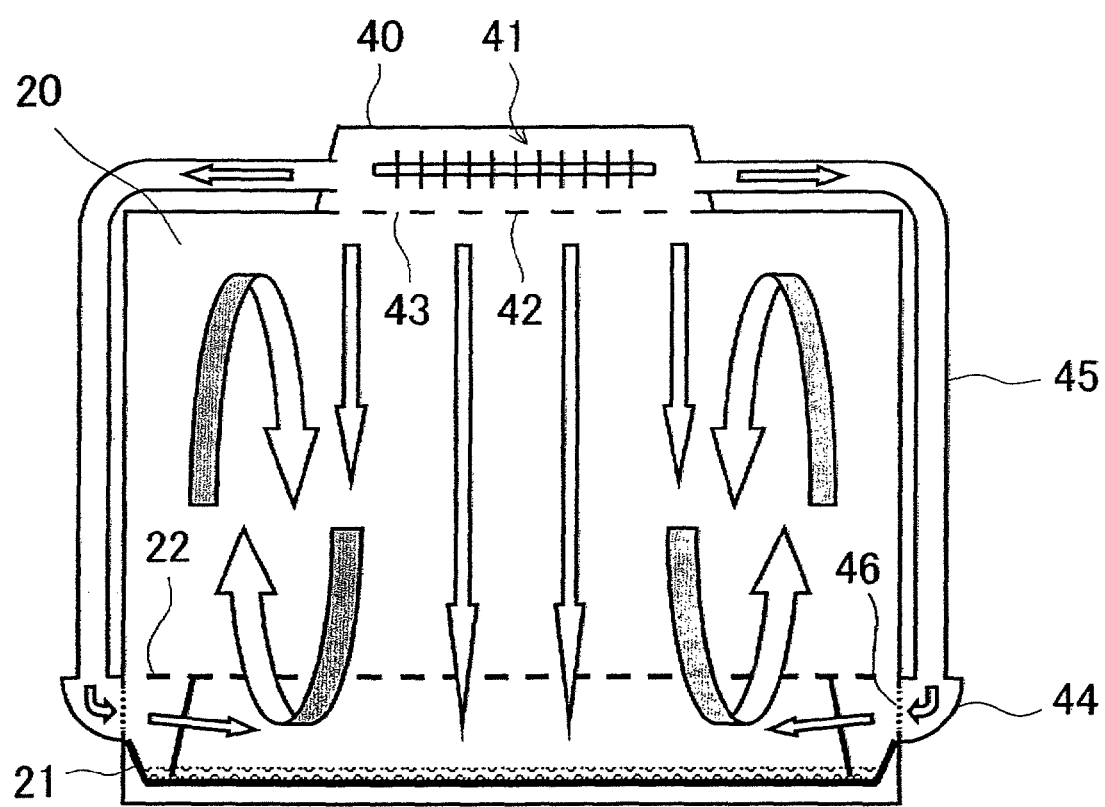
[FIG. 15] A diagram similar to FIG. 5, showing the basic construction in a state different from that shown in FIG. 5.

FIGS. 14 and 15 show the streams of steam as observed when no food F is placed inside the heating chamber 20. Through the upper jet holes 43, steam is jetted out downward so strongly as to reach the floor surface of the heating chamber 20. The steam hits the floor surface and changes its flow direction outward. The steam thus moves out of the downward blow and starts to rise. Since steam, in particular superheated steam, is light, this turning of the flow direction occurs naturally. Consequently, inside the heating chamber 20, convection occurs with a descending stream at the center and an ascending stream around, as indicated by arrows in the figure.

Figure 12:
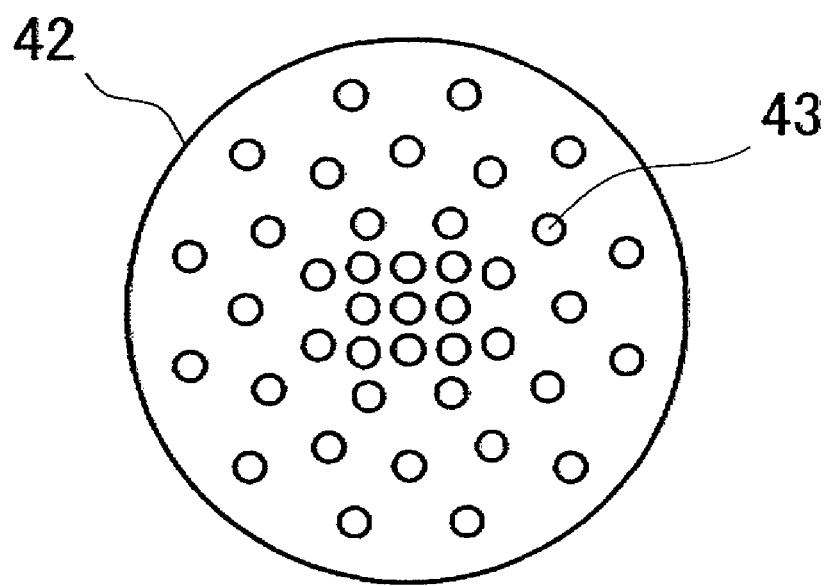
[FIG. 12] A top view of a floor panel of a sub-cavity.

To produce effective convection, the upper jet holes 43 are arranged ingeniously. Specifically, as shown in FIG. 12, the upper jet holes 43 are so arranged as to be dense in a central part of the floor panel 42 and sparse in a peripheral part thereof. This weakens the strength of the downward blow of steam in the peripheral part of the floor panel 42 so as not to hamper the rise of steam, and thus helps produce more effective convection.

Through the side jet holes 46, steam is jetted out sideways. The steam meets in a central part of the heating chamber 20, and then enters the convection produced by the steam from the upper jet holes 43. The steam flowing by convection is sequentially sucked out through the suction port 28. The steam then circulates through the outer circulation passage 30 to the sub-cavity 40, and then returns to the heating chamber 20. In this way, the steam inside the heating chamber 20 repeatedly flows out into the outer circulation passage 30 and then back into the heating chamber 20.

When food F is placed inside the heating chamber 20, the superheated steam heated to about 300° C. and jetted out through the upper jet holes 43 hits the food F and delivers heat thereto. In this process, the temperature of the steam drops to about 250° C. The superheated steam that has touched the surface of the food F condenses on the surface of the food F and thereby releases latent heat. This too heats the food F.

As shown in FIGS. 4 and 5, after delivering heat to the food F, the steam changes its direction outward and moves out of the downward blow. Since steam is light as described previously, having moved out of the downward blow, the steam starts to rise, producing convection inside the heating chamber 20 as indicated by arrows. This convection maintains the temperature inside the heating chamber 20, and keeps the food F hit by the superheated steam just heated in the sub-cavity 40, permitting a large amount of heat to be applied quickly to the food F.

The steam jetted out sideways through the side jet holes 46 reaches, from the left and right sides, under the rack 22 and meets under the food F. Although the steam jetted out through the side jet holes 46 is directed originally in directions tangential to the surface of the food F, as a result of the steam from the left and right sides meeting, it does not flow straight on, but stagnates and fills under the food F. The steam thus behaves as if blown in directions normal to the surface of the food F. This ensures that the heat of steam is delivered to the lower part of the food F.

As described above, with the steam from the side jet holes 46, the part of the food F that is not hit by the steam from the upper jet holes 43 is as well cooked as the upper part. This contributes to an evenly-cooked, neat-looking result. Moreover, the food F receives heat evenly from around the surface thereof. Thus, the food F is heated to its center sufficiently in a short time.

The steam from the side jet holes 46, too, originally has a temperature of about 300° C., and, after it hits the food F, its temperature drops to about 250° C., during which process the steam delivers heat to the food F. Moreover, when the steam condenses on the surface of the food F, it releases latent heat, and thereby heats the food F.

After delivering heat to the lower part of the food F, the steam from the side jet holes 46 enters the convection produced by the steam from the upper jet holes 43. The steam flowing by convection is sequentially sucked out through the suction port 28. The steam then circulates through the outer circulation passage 30 to the sub-cavity 40, and then returns to the heating chamber 20. In this way, the steam inside the heating chamber 20 repeatedly flows out into the outer circulation passage 30 and then back into the heating chamber 20.

As time passes, the amount of steam inside the heating chamber 20 increases. Excessive steam is exhausted out of the apparatus through the exhaust passage. If the steam is exhausted, as it is, outside the cabinet 10, steam condensation occurs on wall surfaces around, leading to growth of mold. However, since the heat dissipating portion 94 is provided midway along the exhaust duct 93, while the steam is passing therethrough, it is deprived of its heat and condenses on the inner surface of the exhaust duct 93. Thus, only a negligible amount of steam escapes out of the cabinet 10, and therefore no serious problems result. The water produced through condensation on the inner surface of the exhaust duct 93 flows downward, in the direction opposite to the exhaustion direction, and enters the heating chamber 20. This water can be disposed of, along with the water otherwise collected in the tray 21.

The cross-sectional area of the flow passage of the vessel 93a leading out of the apparatus is made large, and thus helps reduce the speed at which the steam is exhausted out therethrough. This prevents what is located around the apparatus from being hit by the steam with great force and being damaged.

The side jet holes 46 are located away from the sub-cavity 40, and, as compared with the upper jet holes 43, are therefore located disadvantageously from the perspective of jetting out steam. Nevertheless, as a result of the total area of the left and right side jet holes 46 being larger than the total area of the upper jet holes 43, a sufficient amount of steam can be guided to the side jet holes 46, permitting the upper and lower parts of the food F to be heated more evenly.

Since the food F is heated while the steam inside the heating chamber 20 is circulated, the steam cooking apparatus 1 operates with high energy efficiency. Moreover, since the superheated steam from above is jetted out downward through the plurality of upper jet holes 43 that are so located as to spread largely over the entire floor panel 42 of the sub-cavity 40, largely the entire food F is enveloped in the steam from above. As a result of superheated steam hitting the food F, and this hitting taking place over a large area, the heat of superheated steam is quickly and efficiently delivered to the food F. Moreover, as a result of the steam having entered the sub-cavity 40 being heated by the vapor heating heater 41 and thus expanding, the steam is jetted out with increased strength, and thus hits the food F at an increased speed. This permits the food F to be heated further quickly.

The centrifugal fan 26 can generate a pressure higher than a propeller fan can, and thus helps increase the strength with which steam is jetted out through the upper jet holes 43. This permits superheated steam to be jetted out so strongly as to reach the floor surface of the heating chamber 20, and thus permits the food F to be heated intensely. The centrifugal fan 26 is rotated at a high speed with a direct current motor to produce a strong steam. This helps enhance the benefits mentioned above.

Moreover, the strong blowing power of the blowing device 25 greatly helps to achieve quick exhaustion of gas through an exhaust port 32 when the door 11 is opened to take out the food F.

Since the floor panel 42 of the sub-cavity 40 is dark-colored on the upper surface thereof, it absorbs well the heat radiated from the vapor heating heater 41. The radiated heat absorbed by the floor panel 42 is then radiated, from the equally dark-colored lower surface of the floor panel 42, into the heating chamber 20. This reduces the rise in the temperature inside and on the outer surface of the sub-cavity 40, enhancing safety. Moreover, as a result of the heat radiated from the vapor heating heater 41 being conducted through the floor panel 42 to the heating chamber 20, the heating chamber 20 is heated more efficiently. The floor panel 42 may have a circular shape as viewed in a plan view, or may have a rectangular shape geometrically similar to the heating chamber 20 as viewed in a plan view. As described previously, the ceiling wall of the heating chamber 20 may be shared as the floor panel of the sub-cavity 40.

In a case where the food F is, for example, meat or the like, as its temperature rises, melted fat may drip down therefrom. In a case where the food F is a liquid put in a container, when it boils, part of it may boil over. Anything that drips down or boils over in such a way is collected in the tray 21, so as to be disposed of after the completion of cooking.

As the steam generating device 50 continues generating steam, the water level inside the pot 51 falls. When the pot water level sensor 56 detects that the water level has fallen to a predetermined level, the control device 80 restarts the operation of the water feed pump 57. The water feed pump 57 sucks up water from the water tank 71 to replenish the pot 51 with as much water as has evaporated. When the pot water level sensor 56 detects that the water level inside the pot 51 has risen back to a predetermined level, the control device 80 stops the operation of the water feed pump 57.

Due to the failure of the pot water level sensor 56 or the water feed pump 57, or for other causes, if the water feed pump 57 fails to stop its operation, the water level inside the pot 51 continues to rise beyond the predetermined level. When the water level reaches the overflow level, the water fed from the water feed pump 57 overflows through the overflow water pipe 98 into the vessel 93a, then flows into the exhaust duct 93. Thus, it does not occur that the water inside the pot 51 flows through the steam suction ejector 34 into the outer circulation passage 30. The water that has entered the exhaust duct 93 flows into the heating chamber 20.

Since the vessel 93a is so formed as to have a large cross-sectional area of the flow passage, it can hold a comparatively large amount of water. This permits, even in a case where a large amount of water overflows, the vessel 93a to receive it easily and drain it gradually through the exhaust duct 93.

On completion of cooking, the control device 80 indicates a corresponding message on the operation panel 13 and sounds an alert. Notified of the completion of cooking with these message and alert, the user opens the door 11, and takes the food F out of the heating chamber 20.

When the door 11 starts to be opened, the control device 80 switches the damper 97 into a state in which it opens the duct 96. Now, the air stream flowing through the outer circulation passage 30 flows through the duct 96 to the vessel 93a, and thus almost no part of it flows to the steam generating device 50. This reduces the amount of steam that flows into the sub-cavity 40, and thus now the jetting out, if ever, of steam through the upper jet holes 43 and the side jet holes 46 is extremely weak. This permits the user to take out the food F safely without being hit with steam and burnt on the face, hand, or other part of the body. As long as the door 11 is open, the damper 97 keeps the duct 96 open.

No circulation of steam has thus been conducted through the duct 96 and the vessel 93a, and accordingly these are not so hot as the outer circulation passage 30. Thus, the steam that has flown from the outer circulation passage 30 into the duct 96 and the vessel 93a condenses when it makes contact with the inner wall thereof. The condensed water flows down through the duct 93 and enters the heating chamber 20. This water can be disposed of, along with the water otherwise collected at the bottom of the heating chamber 20, after the completion of cooking.

Since the vessel 93a is so formed as to have a large cross-sectional area of the flow passage, it has a larger inner surface area. This permits a substantial part of the steam that has flown through the duct 96 into the vessel 93a to condense on the inner surface thereof, reducing the amount of steam to be exhausted out therethrough.

If the blowing device 25 is started all over from a resting state to achieve exhaustion, a time lag arises until it reaches a steadily blowing state. In this embodiment, the blowing device 25 is already operating, and thus no time lag arises. Moreover, the air stream that has thus far been circulating through the heating chamber 20 and the outer circulation passage 30 becomes, as it is, the air stream exhausted out through the vessel 93a. Thus, no time lag arises even for changing the direction of the air stream. This makes it possible to quickly exhaust the steam inside the heating chamber 20 and thereby to shorten the time for which the door 11 needs to be kept inhibited from being opened.

When the user starts to open the door 11, this condition can be recognized by the control device 80, for example, in the following manner. A latch for keeping the door 11 closed is provided between the cabinet 10 and the door 11, and a latch lever for unlocking the latch is provided on the handle 12 so as to be exposed out of it. A switch that opens and closes as the latch or the latch lever is operated is arranged inside the door 11 or the handle 12 so that, when the user grips the handle 12 and the latch lever to unlock, the switch transmits a signal to the control device 80.

As described earlier, the steam generating heater 52 is composed of the main heater 52a and the sub heater 52b. The main heater 52a produces a larger amount of heat than the sub heater 52b. Here, the electric power consumption of the main heater 52a is set at 700 W, and the electric power consumption of the sub heater 52b is set at 300 W. To control how electric power is supplied to the main heater 52a and the sub heater 52b, the control device 80 has the following two modes: the mode of making the steam generating heater 52 have a total electric power consumption of 1000 W by supplying electric power to both the main heater 52a and the sub heater 52b, and the mode of making the steam generating heater 52 have a total electric power consumption of 300 W by supplying electric power only to the sub heater 52b.

The vapor heating heater 41, too, is composed of the main heater 41a and the sub heater 41b. The main heater 41a produces a larger amount of heat than the sub heater 41b. Here, the electric power consumption of the main heater 41 a is set at 1000 W, and the electric power consumption of the sub heater 41b is set at 300 W. To control how electric power is supplied to the main heater 41a and the sub heater 41b, the control device 80 has the following three modes: the mode of making the vapor heating heater 41 have a total electric power consumption of 1300 W by supplying electric power to both the main heater 41a and the sub heater 41b, the mode of making the vapor heating heater 41 have a total electric power consumption of 1000 W by supplying electric power only to the main heater 41a, and the mode of making the vapor heating heater 41 have a total electric power consumption of 300 W by supplying electric power only to the sub heater 41b. The mode for a total electric power consumption of 1300 W is used for generating hot air containing no steam; the modes for a total electric power consumption of 1000 W and 300 W are used for superheating steam.

The utilization of the configuration described above permits various cooking menus shown in FIG. 16 to be selected.

For a "steam" menu, on the steam generating heater 52 side, electric power is supplied to both the main heater 52a and the sub heater 52b; on the vapor heating heater 41 side, electric power is supplied only to the sub heater 41b.

Assume that the heating efficiency of the steam generating device 50 is 82.0%. Then, an electric power consumption of 1000 W, the electric power consumed by the steam generating heater 52 when electric power is supplied to both the main heater 52a and the sub heater 52b, is approximately the same as the heater power required to generate 22 grams of steam per minute in FIG. 17. That amount of steam can be turned into superheated steam having a temperature of 130° C. with the vapor heating heater 41 by means of the 300 W sub heater 41b. This permits "steam" cooking to be performed using the resulting superheated steam, instead of hot air, as a main heat transfer medium. The total electric power consumption of the steam generating heater 52 and the vapor heating heater 41 is 1300 W, which is within the electric power capacity of a single household wall outlet.

Cooking by superheated steam proceeds as follows.
  (a) When superheated steam having a temperature of more than 100° C. touches the surface of food, it condenses on the surface of the food, and thereby delivers condensation heat thereto.
  (b) Thus, the surface temperature of the food rises more quickly with the superheated steam than with the hot air.
  (c) Since the surface temperature of the food rises quickly, the temperature inside the food also rises quickly due to thermal conduction. The steam that has released condensed latent heat is turned into hot water. The resultant hot water penetrates deep into the food and thereby raises the internal temperature of the food, and also locks moisture into the food.
  (d) When the surface temperature of the food reaches 100° C., the superheated steam repeatedly condenses and evaporates on the surface of the food. That is, the surface temperature of the food has reached a temperature plateau at approximately 100° C.
  (e) With continued heating, the food dries on the outside with a surface temperature exceeding 100° C., and starts to brown.

If superheated steam has a temperature of 130° C. or lower, the procedure reaches stage (c) described above. In this stage, "steam" and "boil" cooking can be performed.

If superheated steam has a temperature of 150° C. or higher, the procedure reaches stages (d) or (e) described above. In these stages, "brown" and "grill" cooking can be performed.

The larger amount of steam does not guarantee the greater benefits of cooking by superheated steam. In the case of "steam" and "boil" cooking performed at a steam temperature of 130° C. or lower, the upper limit of the steam amount is determined by the amount of steam that has been attached to the food through the stages (a) to (c) described above, the stages in which the condensed water has some effect on the food. The steam exceeding this upper limit does not attach to the food, and thereby it diminishes its effect on food.

On the other hand, in the case of "brown" cooking by superheated steam having a temperature of 150° C. or higher, the larger the steam amount, the larger the amount of water that penetrates deep into the food. This makes longer the temperature plateau at approximately 100° C. in the stage described under (d) above, requiring a longer time for the food to start to brown. Thus, it is preferable that a moderate amount of superheated steam be present.

Based on these findings, experiments were conducted to evaluate the steam amount suitable for "steam" and "boil" cooking. The results of the experiments show that, in a case where the size of the heating chamber is of the order of size of a common heating cooking apparatus for household use, the optimum steam amount is just enough to evaporate 15 to 25 grams of water from food per minute.

On the other hand, experiments were conducted to evaluate the steam amount suitable for "brown" cooking. The results of the experiments show that, in a case where the size of the heating chamber is of the order of size of a common heating cooking apparatus for household use, the optimum steam amount is just enough to evaporate 5 to 10 grams of water from food per minute.

Assume that a permissible value for electric power consumption is 1300 W. Then, to increase the amount of steam by increasing the electric power consumption of the steam generating heater 52, it is inevitably necessary to reduce the electric power consumption of the vapor heating heater 41. Consider, for example, a case in which the ratio of the electric power consumption of the steam generating heater 52 to that of the vapor heating heater 41 is 1000 W:300 W, i.e. 10:3. Here, inconveniently, putting still more weight on the steam generating heater makes it impossible to turn steam into superheated steam having a temperature of 130° C. In Japanese households, it is understood that a permissible electric power of a single wall outlet is of the order of 1500 W. Thus, it is practical enough to set an electric power consumption at 1000 W for the steam generating heater 52 and at 300 W for the vapor heating heater 41 to perform "steam" and "boil" cooking.

For a "brown" menu, on the steam generating heater 52 side, electric power is supplied only to the sub heater 52b; on the vapor heating heater 41 side, electric power is supplied only to the main heater 41a. In this case, the total electric power consumption of the steam generating heater 52 and the vapor heating heater 41 is 1300 W.

An electric power consumption of 300 W, the electric power consumed by the sub heater 52b of the steam generating heater 52, is approximately the same as the heater power required to generate 6.5 grams of steam per minute in FIG. 17. In a case where there is about this amount of steam and the vapor heating heater 41 is allocated 1000 W, the temperature of the superheated steam reaches 200° C. or higher. This makes it possible to brown the food while performing cooking by superheated steam.

When "steam", "boil", or "brown" cooking is performed by generating steam by supplying electric power to the steam generating heater 52, instead of concentrating electric power consumption on the steam generating heater 52, a certain amount of electric power is also allocated to the vapor heating heater 41. This is because superheated steam is not generated unless electric power is supplied to the vapor heating heater 41. By contrast, the vapor heating heater 41 can be used alone independently of the steam generating heater 52.

For a "grill" menu, electric power is not supplied to the steam generating heater 52; on the vapor heating heater 41 side, electric power is supplied to both the main heater 41a and the sub heater 41b. This makes it possible to perform cooking by only hot air without relying on steam. In this case, the total electric power consumption of the steam generating heater 52 and the vapor heating heater 41 is 1300 W.

As described above, according to a selected cooking menu, the control device 80 changes a mode of use of the main heater 52a and the sub heater 52b of the steam generating heater 52, and the main heater 41a and the sub heater 41b of the vapor heating heater 41. In this way, the control device 80 can control the vapor heating heater 41 so as to produce a larger amount of heat than the steam generating heater 52, and control the steam generating heater 52 so as to produce a larger amount of heat than the vapor heating heater 41. This makes it possible to offer a cooking menu aimed at achieving a benefit resulting from cooking by steam and a cooking menu aimed at achieving a benefit resulting from cooking by hot air, and thereby to perform cooking suitable to the properties of food.

In addition, the control device 80 controls the steam generating heater 52 and the vapor heating heater 41 in such a way that the total electric power consumption thereof does not exceed a permissible value (here, 1300 W). This ensures safe use even in a place where a permissible current value is limited.

The steam generating heater 52 and the vapor heating heater 41 are each composed of a main heater and a sub heater, of which the former produces a larger amount of heat than the latter. The amount of heat is switched by supplying electric power to the main heater, or to the sub heater, or to both. This helps simplifies an electric power control system, and thus helps reduce the cost required for the control device.

Since the total electric power consumption of the vapor heating heater 41 is approximately the same as the permissible value, it is possible to perform cooking by hot air by exploiting electric power to the limit of the permissible value. Likewise, the amount of heat obtained by adding the amount of heat of the sub heater 41b of the vapor heating heater 41 to the total amount of heat of the steam generating heater 52 is also approximately the same as the permissible value. Thus, it is possible to perform cooking by superheated steam obtained as a result of the steam generated with the steam generating device 50 being superheated with the vapor heating heater 41 by exploiting electric power to the limit of the permissible value.

Moreover, since the electric power consumption of the steam generating heater 52 is so set that the main heater 52a has an electric power consumption of 700 W and the sub heater 52b has an electric power consumption of 300 W, it becomes possible to select the following two modes: the mode of generating steam at an electric power consumption of 1000 W by using the both the main heater 52a and the sub heater 52b, and the mode of generating steam at an electric power consumption of 300 W by using only the sub heater 52b. Furthermore, since the electric power consumption of the vapor heating heater 41 is so set that the main heater 41 a has an electric power consumption of 1000 W and the sub heater 41b has an electric power consumption of 300 W, it becomes possible to select the following three modes: the mode of heating gas at an electric power consumption of 1300 W by using both the main heater 41a and the sub heater 41b, the mode of superheating steam at an electric power consumption of 1000 W by using only the main heater 41a, and the mode of superheating steam at an electric power consumption of 300 W by using only the sub heater 41b.

According to the aforementioned setting of the electric power consumption, the following options are possible: the option of turning the steam generated at an electric power consumption of 1000 W into superheated steam at an electric power consumption of 300 W, the option of turning the steam generated at an electric power consumption of 300 W into superheated steam at an electric power consumption of 1000 W, and the option of generating hot air containing no steam at an electric power consumption of 1300 W. In each case, the electric power consumption is within the electric power capacity of a single household wall outlet.

Instead, the electric power consumption of the steam generating heater 52 can be so set that the main heater 52a has an electric power consumption of 1000 W and the sub heater 52b has an electric power consumption of 300 W.

With the configuration described above, it is possible to select the following two modes: the mode of generating steam at an electric power consumption of 1000 W by using the main heater 52a, and the mode of generating steam at an electric power consumption of 300 W by using the sub heater 52b. In a case where the electric power consumption of the vapor heating heater 41 is so set that the main heater 41a has an electric power consumption of 1000 W and the sub heater 41*b* has an electric power consumption of 300 W, it is possible to select the following three modes: the mode of heating gas at an electric power consumption of 1300 W by using both the main heater 41*a* and the sub heater 41*b*, the mode of superheating steam at an electric power consumption of 1000 W by using only the main heater 41*a*, and the mode of superheating steam at an electric power consumption of 300 W by using only the sub heater 41*b*. Thus, the following options are possible: the option of turning the steam generated at an electric power consumption of 1000 W into superheated steam at an electric power consumption of 300 W, the option of turning the steam generated at an electric power consumption of 300 W into superheated steam at an electric power consumption of 1000 W, and the option of generating hot air containing no steam at an electric power consumption of 1300 W. In each case, the electric power consumption is within the electric power capacity of a single household wall outlet.

Heating modes of the steam cooking apparatus 1 are classified into a first heating mode (hereinafter referred to as "heating mode A") that uses superheated steam obtained as a result of the steam generated with the steam generating device 50 being heated with the vapor heating heater 41 and a second heating mode (hereinafter referred to as "heating mode B") that uses hot air or radiation heat obtained by making the vapor heating heater 41 produce heat without supply of steam. The heating mode A corresponds to "steam" and "brown" menus in the table shown in FIG. 16; the heating mode B corresponds to a "grill" menu in the table shown in FIG. 16. The heating modes A and B can be combined to form various cooking sequences for automatic cooking in which everything is left to the steam cooking apparatus 1, or manual cooking in which the user is allowed to perform setting of conditions. Examples of such cooking sequences are shown in the table of FIG. 18. It is to be understood that, in this example, the steam cooking apparatus is designed for use in Europe, and thus the electric power consumption of the steam generating heater and the vapor heating heater can exceed 1300 W.

An exemplary sequence is so set that, during the first half of cooking, heating is largely performed in the heating mode A, and, during the second half thereof, heating is largely performed in the heating mode B. In terms of cooking categories, this sequence corresponds to "steam-grill—raw foods" or "steam-grill—convenience store foods".

In a case where "steam-grill—raw foods" is selected, menus such as "sausages", "bacon", "chicken (thigh/other parts)", "hamburgers", and "pork chops" are indicated in the display portion on the operation panel 13, and a cooking sequence composed of the following four stages: "preheating 1", "preheating 2", "cooking 1", and "cooking 2" is carried out. In "preheating 1", by exploiting 100% of 1300 W capacity of the vapor heating heater 41, the temperature inside the heating chamber 20 is heated to 220° C. In "preheating 2", by exploiting 100% of 1300 W capacity of the vapor heating heater and 50% of 1000 W capacity of the steam generating heater 52, the temperature inside the heating chamber 20 is heated to 250° C. In "cooking 1", by exploiting 100% of 1300 W capacity of the vapor heating heater 41 and 50% of 1000 W capacity of the steam generating heater 52, an operation for maintaining the temperature inside the heating chamber 20 at 250° C. is carried out for 70% of the total cooking time. In "cooking 2", electric power supply to the steam generating heater 52 is stopped, and, by exploiting 100% of 1300 W capacity of the vapor heating heater 41, an operation for maintaining the temperature inside the heating chamber 20 at 250° C. is carried out for 30% of the total cooking time.

In a case where "steam-grill—convenience store foods" is selected, menus such as "fried fish (frozen)", "fried chicken (frozen)", "fried fish (chilled)", and "fried chicken (chilled)" are indicated in the display portion on the operation panel 13, and a cooking sequence composed of the following three stages: "preheating 1", "preheating 2", and "cooking 1" is carried out. In "preheating 1", by exploiting 100% of 1300 W capacity of the vapor heating heater 41, the temperature inside the heating chamber 20 is heated to 220° C. In "preheating 2", by exploiting 100% of 1300 W capacity of the vapor heating heater and 50% of 1000 W capacity of the steam generating heater 52, the temperature inside the heating chamber 20 is heated to 250° C. In "cooking 1", by exploiting 100% of 1300 W capacity of the vapor heating heater 41 and 50% of 1000 W capacity of the steam generating heater 52, an operation for maintaining the temperature inside the heating chamber 20 at 250° C. is carried out for 80% of the total cooking time, then, electric power supply to the steam generating heater 52 is stopped, and, by exploiting 100% of 1300 W capacity of the vapor heating heater 41, an operation for maintaining the temperature inside the heating chamber 20 at 250° C. is carried out for 20% of the total cooking time.

Another exemplary sequence is so set that cooking is largely performed in the heating mode A. In terms of cooking categories, this sequence corresponds to "steam-roast" or "steam-bake—convenience store foods".

Although this sequence features "cooking largely performed in the heating mode A", supply of steam is stopped midway through cooking as shown in the exemplary sequence of FIG. 18 due to the limited capacity of the water tank 71. If unlimited supply of water is possible, cooking may be performed by superheated steam from beginning to end.

In a case where "steam-roast" is selected, menus such as "roast chicken", "roast pork", and "roast beef" are indicated in the display portion on the operation panel 13, and a cooking sequence composed of "cooking 1" and "cooking 2" is carried out. In "cooking 1", by exploiting 100% of 1300 W capacity of the vapor heating heater 41 and 50% of 1000 W capacity of the steam generating heater 52, an operation for maintaining the temperature inside the heating chamber 20 at a preset temperature is carried out for 30 minutes. In "cooking 2", electric power supply to the steam generating heater 52 is stopped, and, by exploiting 100% of 1300 W capacity of the vapor heating heater 41, an operation for maintaining the temperature inside the heating chamber 20 at a preset temperature is carried out for a time obtained by subtracting 30 minutes from the total cooking time.

In a case where "steam-bake—convenience store foods" is selected, menus such as "pizza (frozen)", "French loaf (frozen)", and "lasagna (frozen)" are indicated in the display portion on the operation panel 13, and a cooking sequence composed of the following three stages: "preheating 1", "cooking 1", and "cooking 2" is carried out. In "preheating 1", by exploiting 100% of 1300 W capacity of the vapor heating heater 41, the temperature inside the heating chamber 20 is heated to a preset temperature. In "cooking 1", by exploiting 100% of 1300 W capacity of the vapor heating heater and 70% of 1000 W capacity of the steam generating heater 52, an operation for maintaining the temperature inside the heating chamber 20 at a preset temperature is carried out for 30 minutes. In "cooking 2", electric power supply to the steam generating heater 52 is stopped, and, by exploiting 100% of 1300 W capacity of the vapor heating heater 41, an operation for maintaining the temperature inside the heating chamber 20 at a preset temperature is carried out for a time obtained by subtracting 30 minutes from the total cooking time.

Still another exemplary sequence is so set that, during the first half of cooking, heating is largely performed in the heating mode B, and, during the second half thereof, heating is largely performed in the heating mode A. In terms of cooking categories, this sequence corresponds to "steam-bake—cakes". In the exemplary sequence of FIG. 18, at the end of cooking, heat is applied in the heating mode B for a short time to remove a distinct smell and texture resulting from the use of steam.

In a case where "steam-bake—cakes" is selected, menus such as "bread", "pastries", and "cakes" are indicated in the display portion on the operation panel 13, and a cooking sequence composed of the following four stages: "preheating 1", "cooking 1", "cooking 2", and "cooking 3" is carried out. In "preheating 1", by exploiting 100% of 1300 W capacity of the vapor heating heater 41, the temperature inside the heating chamber 20 is heated to 220° C. In "cooking 1", by exploiting 60% of 1300 W capacity of the vapor heating heater 41, an operation for maintaining the temperature inside the heating chamber 20 at a preset temperature is carried out for 45% of the total cooking time without supplying electric power to the steam generating heater 52. In "cooking 2", by exploiting 60% of 1300 W capacity of the vapor heating heater 41 and 30% of 1000 W capacity of the steam generating heater 52, an operation for maintaining the temperature inside the heating chamber 20 at a preset temperature is carried out for 45% of the total cooking time. In "cooking 3", by exploiting 60% of 1300 W capacity of the vapor heating heater 41, an operation for maintaining the temperature inside the heating chamber 20 at a preset temperature is carried out for 10% of the total cooking time without supplying electric power to the steam generating heater 52.

The conditions associated with the above described cooking sequence can be changed by the user by operating the operation panel 13. This permits the user to perform cooking according to their own tastes.

Likewise, the duration of a heating mode that largely performs heating during the second half of cooking can be adjusted by the user by operating the operation panel 13. This makes it possible to adjust doneness of food from light to dark.

In a case where both the heating mode A and the heating mode B are included in one sequence, it can be set so that the duration of the heating mode A is adjusted. This makes it possible to emphasize or weaken the characteristic of superheated steam.

The operation panel 13 serves as sequence selecting means and also as heating time setting means or heating time/heating temperature setting means. When a heating time is set, the allocation of time to the heating modes in a sequence is decided based on the previously set conditions. In this way, a sequence for manual cooking can be set.

In a case where a sequence in which cooking is performed in the heating mode A from beginning to end is set, the duration of the heating mode A can be adjusted, and the controlled temperature of the heating mode A can be set so as to be equal to or lower than 130° C. This prevents erroneous setting when "warm up" or "steam" cooking is performed.

In a case where a sequence in which cooking is largely performed in the heating mode A is set, names of food (for example, an egg) that can explode when inner pressure is increased by microwave heating, or food (for example, retort pouch food packed in packaging formed of materials including a metal film) packed in packaging that blocks the passage of microwaves are indicated, as it is, in the display portion on the operation panel 13. Specifically, characters such as "egg/retort pouch food" are indicated in the display portion. This eliminates psychological barriers to leaving food to automatic cooking by steam, the food that the user normally hesitates to leave to automatic heating by steam in fear of explosion or heating failure.

Instead of characters, icons representing an egg and retort pouch food may be indicated. Alternatively, characters and icons may be indicated at the same time.

For thin food such as beefsteaks or hamburgers, suitable is a heating pattern in which, during the first half of cooking, cooking is largely performed in the heating mode A, and, during the second half thereof, cooking is largely performed in the heating mode B.

Figure 19:
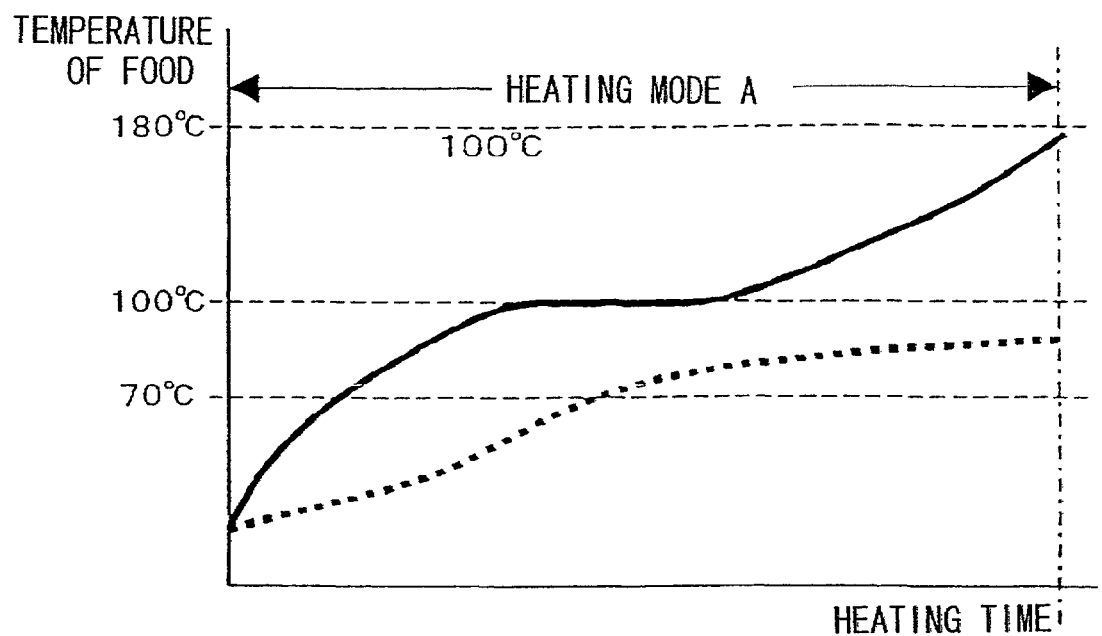
[FIG. 19] A first graph showing the influence of a heating mode on food.

FIG. 19 is a graph showing a state in which thin food is continuously heated only in the heating mode A. Here, the solid line indicates a surface temperature of the food, and the broken line indicates a food center temperature. In this case, when the surface temperature of the food reaches almost 100° C., the food center temperature rises to almost 70° C., which is the optimal temperature thereof. The food center temperature continues to rise while the surface temperature of the food remains at about 100° C., and, in a temperature zone (180° C.) in which the surface of the food dries up and is browned, the food center temperature exceeds the proper temperature, indicating an overheated condition.

Figure 20:
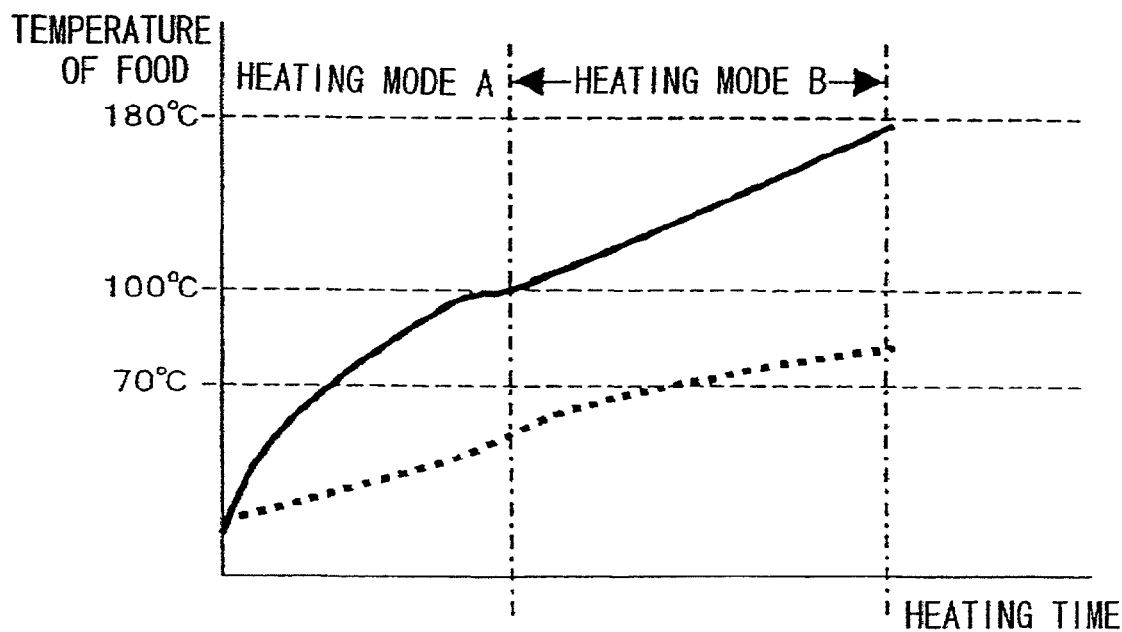
[FIG. 20] A second graph showing the influence of a heating mode on food.

On the other hand, assume that heating is performed in the heating mode B during the second half of cooking. Then, a result shown in the graph of FIG. 20 is obtained. In the heating mode B, the surface temperature of the food remains at about 100° C. for shorter time, and the food center temperature rises more gradually. This makes it possible to adjust the time at which the food is browned to coincide with the time at which the center of the food reaches the optimal temperature. This also helps shorten the total heating time.

For thick and heavy food such as food to be roasted, suitable is a heating pattern in which cooking is performed in the heating mode A from beginning to end.

Figure 21:
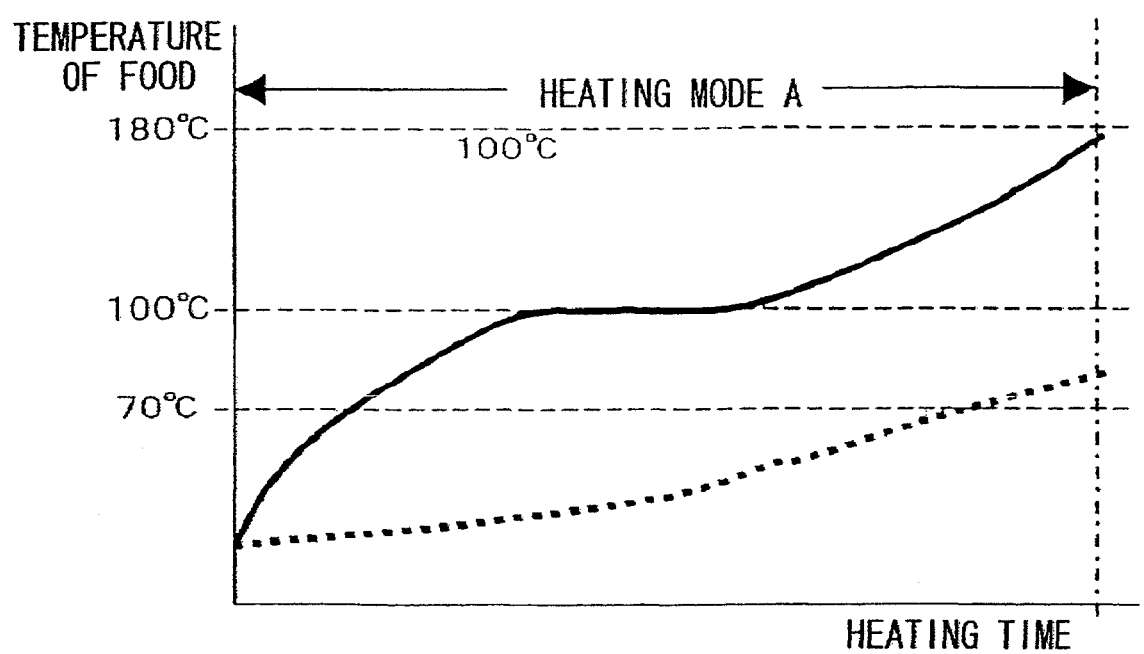
[FIG. 21] A third graph showing the influence of a heating mode on food.

FIG. 21 is a graph showing a state in which thick and heavy food is continuously heated only in the heating mode A. Here, the solid line indicates a surface temperature of the food, and the broken line indicates a food center temperature. In the case of thick and heavy food, as compared with the surface temperature of the food, the food center temperature rises more slowly. This is because it takes more time for thermal conduction or penetration of condensed water through the surface of the food. Thus, by continuously performing cooking by superheated steam until the surface temperature reaches a temperature zone (180° C.) in which the surface of the food is browned, it is possible to adjust the time at which the food center temperature reaches the optimal temperature (70° C.) to coincide with the completion time of cooking. In addition to that, as compared with when heating is performed only in the heating mode B, cooking is completed in a smaller amount of time.

For food, such as cakes, that require to observe a delicate mixing ratio of ingredients, suitable is a heating pattern in which, during the first half of cooking, cooking is largely performed in the heating mode B, and, during the second half thereof, cooking is largely performed in the heating mode A.

Figure 22:
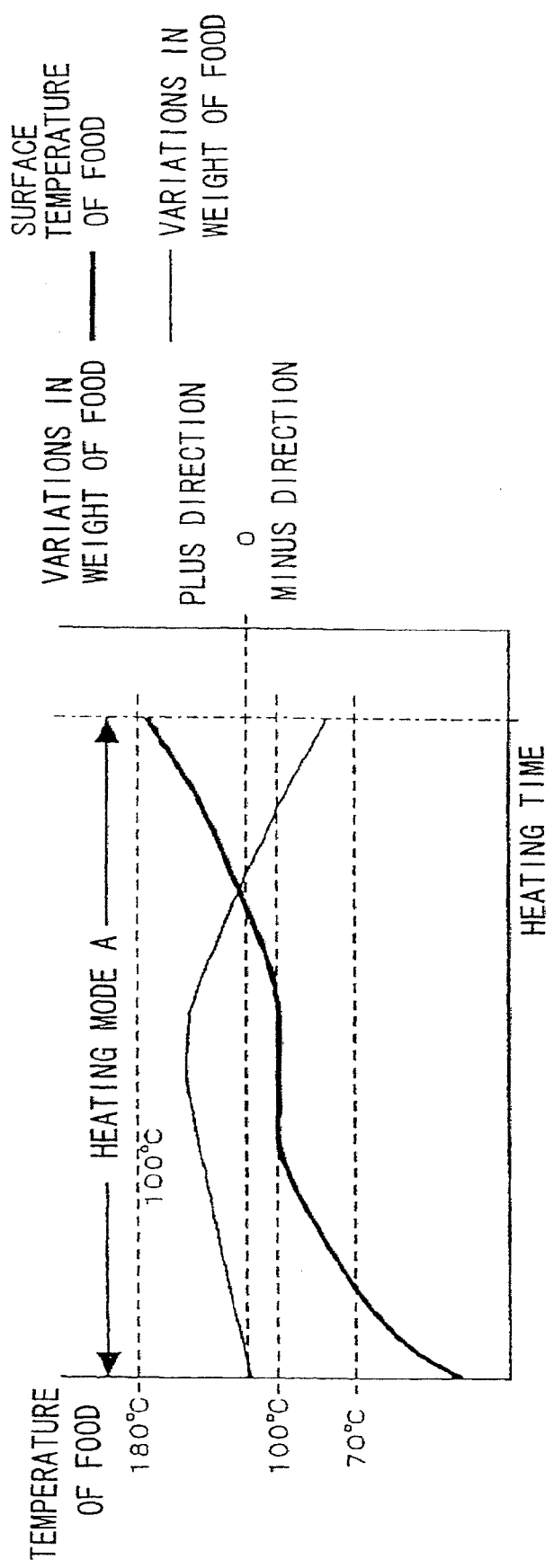
[FIG. 22] A fourth graph showing the influence of a heating mode on food.

FIG. 22 is a graph showing the food surface temperature and variations in the weight of food to be baked when it is continuously heated only in the heating mode A. Here, the solid line indicates a surface temperature of the food, and the broken line indicates variations in the weight of the food. As a result of the condensed water penetrating deep into the food until the surface temperature of the food reaches about 100° C., the weight of the food is changed to the plus side. While the surface temperature of the food remains at about 100° C., a gradient with which the weight of the food varies is reversed. As beating continues, the food starts losing moisture, and the weight of the food is changed to the minus side.

In the case of food that require to observe a delicate mixing ratio of ingredients, too much moisture given in the earlier stage of cooking leads to an unsatisfactory result. Thus, during the earlier stage of cooking, heating is performed in the heating mode B in such a way that no moisture is given to the food, and, during the second half of cooking, heating is performed in the heating mode A. This ensures both a satisfactory result and a shorter heating time.

The above description has been given of three types of typical heating patterns. In addition to these heating patterns, it is also possible to make fine adjustments on a food-by-food basis by changing the ratio of time of the heating mode A to time of the heating mode B, or by adding different heating modes before or after the heating modes A and B.

Cooking by superheated steam has the following features.
a. The internal temperature of the food rises quickly.
b. Condensed water is attached to food.
c. Low-oxygen cooking is possible (when the heating chamber is filled with superheated steam and air is replaced therewith, oxygen concentration is reduced from the normal 20% to a few percent or less).

The aforementioned features provide the following benefits to food.

A. Defatting
As the internal temperature of the food rises, fat in the food melts and oozes to the surface thereof. The melted fat drips down therefrom alone or along with the condensed water attached to the surface of the food. In this way, it is possible to achieve more effective defatting as compared with other cooking methods.

B. Decreasing salt intake
Salt around the surface of the food is dissolved into condensed water attached to the surface of the food, and then drips down therefrom along with the condensed water. In this way, it is possible to decrease salt intake more effectively as compared with other cooking methods.

C. Protection against oxidation of vitamins and oils and fats
Vitamins C and E and oils and fats deteriorate by oxidation, resulting in the loss of their normal functions, colors, or flavors, or giving off a bad smell. Low-oxygen cooking by superheated steam is effective in preventing oxidation, and easier to carry out as compared with other cooking methods of preventing oxidation of foods (for example, vacuum cooking).

As described above, it can be said that cooking by superheated steam is a cooking method that responds to the increasing awareness of health issues. While some people like foods cooked by superheated steam, others do not, because foods cooked by superheated steam have subtly different textures and tastes from those cooked by conventional cooking methods. Thus, in a case where the feature of superheated steam is desired to be emphasized, time of the heating mode A is made longer so as to make the internal temperature of the food rise more quickly, or make more condensed water attach to the food. On the other hand, in a case where the feature of superheated steam is not desired to be emphasized, the ratio of time of the heating mode A is made smaller and the ratio of time of the heating mode B is made larger accordingly.

INDUSTRIAL APPLICABILITY

The present invention finds application in cooking apparatuses in general that perform cooking by the use of steam, irrespective of whether they are for household use or business use.

The invention claimed is:
1. A steam cooking apparatus comprising:
a heating chamber in which food is placed;
a steam generating device that generates steam to be fed to the heating chamber; and
a vapor heating heater that heats the steam generated by the steam generating device;
a control device for controlling the steam generating device to generate steam when the steam generating device is selected and for controlling the vapor heating heater heating the steam when the vapor heating heater is selected, wherein
the control device controls a first heating mode in which steam is condensed on a surface of the food to produce condensed water so that the condensed water drips, along with a salt content around the surface of the food, down from the food, and
the control device controls a second heating mode in which the food is baked or roasted to completion with hot air or radiation heat, and the first heating mode and the second heating mode are combined such that first the first heating mode and then the second heating mode are executed in that order by the control device
so that the food is first subjected to salt content reduction and then baked or roasted to completion.

2. The steam cooking apparatus according to claim 1, wherein
the steam generating device and/or the vapor heating heater comprises a main heater and a sub heater, and
the control device controlling the stream cooking apparatus so that electric power consumption does not exceed a predetermined permissible value of electric power consumption irrespective of how the main and sub heaters of the steam generating device and/or the main and sub heaters of the vapor heating heater are combined.

3. The steam cooking apparatus according to claim 1, wherein, having, as a cooking menu thereof, at least one of steaming, boiling, grilling, roasting, baking, cake, and convenience store food.

4. The steam cooking apparatus according to claim 1, wherein an amount of steam fed to the heating chamber is in the range of 5 to 25 grams per minute.

5. The steam cooking apparatus according to claim 1, wherein an outer circulation passage is provided outside the heating chamber, and the outer circulation passage is fitted with a blowing device that sucks in gas inside the heating chamber and then returns the sucked gas to the heating chamber.

6. The steam cooking apparatus according to claim 1, wherein
the vapor heating heater heats the steam generated by the steam generating device to provide superheated steam,
the first heating mode uses the superheated steam obtained from the vapor heating heater, and
the second heating mode uses the hot air or the radiation heat without use of the steam generating device so that the second heating mode produces heat without steam.

7. The steam cooking apparatus according to claim 1, wherein
the control device controls the steam generating device and the vapor heating heater to produce steam having a temperature of more than 100° C. and less than 130° C.

8. A steam cooking apparatus comprising:
a heating chamber in which food is placed;
a steam generating device that generates steam to be fed to the heating chamber; and a vapor heating heater that heats the steam generated by the steam generating device;

a control device for controlling the steam generating device to generate steam when the steam generating device is selected and for controlling the vapor heating heater heating the steam when the vapor heating heater is selected, wherein the control device controls a first heating mode in which steam is condensed on a surface of the food to produce condensed water so that the condensed water drips, along with a fat content around the surface of the food, down from the food, and the control device controls a second heating mode in which the food is baked or roasted to completion with hot air or radiation heat, and the first heating mode and the second heating mode are combined such that first the first heating mode and then the second heating mode are executed in that order by the control device so that the food is first subjected to fat content reduction and then baked or roasted to completion.

9. The steam cooking apparatus according to claim 8, wherein the steam generating device and/or the vapor heating heater comprises a main heater and a sub heater, and the control device controlling the stream cooking apparatus so that electric power consumption does not exceed a predetermined permissible value of electric power consumption irrespective of how the main and sub heaters of the steam generating device and/or the main and sub heaters of the vapor heating heater are combined.

10. The steam cooking apparatus according to claim 8, wherein, having, as a cooking menu thereof, at least one of steaming, boiling, grilling, roasting, baking, cake, and convenience store food.

11. The steam cooking apparatus according to claim 8, wherein an amount of steam fed to the heating chamber is in the range of 5 to 25 grams per minute.

12. The steam cooking apparatus according to claim 8, wherein an outer circulation passage is provided outside the heating chamber, and the outer circulation passage is fitted with a blowing device that sucks in gas inside the heating chamber and then returns the sucked gas to the heating chamber.

13. The steam cooking apparatus according to claim 8, wherein the control device controls the steam generating device and the vapor heating heater to produce steam having a temperature of more than 150° C.

* * * * *